US 9,661,571 B2

(12) United States Patent
Iwai et al.

(10) Patent No.: US 9,661,571 B2
(45) Date of Patent: May 23, 2017

(54) METHOD OF DETERMINING EXPIRATION PERIOD OF TIMER, NETWORK NODE, AND NON-TRANSITORY COMPUTER READABLE MEDIUM

(71) Applicant: NEC Corporation, Tokyo (JP)

(72) Inventors: Takanori Iwai, Tokyo (JP); Toshiyuki Tamura, Tokyo (JP); Hajime Zembutsu, Tokyo (JP); Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/410,648

(22) PCT Filed: May 28, 2013

(86) PCT No.: PCT/JP2013/003364
§ 371 (c)(1),
(2) Date: Dec. 23, 2014

(87) PCT Pub. No.: WO2014/006815
PCT Pub. Date: Jan. 9, 2014

(65) Prior Publication Data
US 2015/0173013 A1 Jun. 18, 2015

(30) Foreign Application Priority Data

Jul. 6, 2012 (JP) .................................. 2012-153091

(51) Int. Cl.
*H04M 3/00* (2006.01)
*H04W 52/02* (2009.01)
(Continued)

(52) U.S. Cl.
CPC ....... *H04W 52/0212* (2013.01); *H04W 52/02* (2013.01); *H04W 52/0232* (2013.01);
(Continued)

(58) Field of Classification Search
CPC ......... H04W 52/0212; H04W 52/0216; H04W 52/0232; H04W 52/02; H04W 8/22;
(Continued)

(56) References Cited

U.S. PATENT DOCUMENTS

2003/0076804 A1\* 4/2003 Sivalingham ........... H04L 47/14
370/338
2005/0192046 A1 9/2005 Harris
(Continued)

FOREIGN PATENT DOCUMENTS

EP 1 583 389 A1 10/2005
EP 1 758 425 A1 2/2007
(Continued)

OTHER PUBLICATIONS

International Search Report corresponding to PCT/JP2013/003364, dated Jun. 25, 2013 (5 pages).
(Continued)

*Primary Examiner* — Khai M Nguyen
(74) *Attorney, Agent, or Firm* — Wilmer Cutler Pickering Hale and Dorr LLP

(57) ABSTRACT

A network node (300) determines an expiration period of a timer (101) based on a predetermined parameter. The timer (101) is used to determine a transition from a CONNECTED state to an IDLE state of a mobile terminal (200) connected to a core network (20) through a radio access network (10). The predetermined parameter includes at least one of (a) a parameter regarding a frequency of connection of the mobile terminal (200) to the core network (20), (b) a parameter regarding a load on control signal processing by a mobility management node (300) arranged in the core network (20), (c) a parameter regarding a frequency of movement of the
(Continued)

mobile terminal (200) between base stations (100), and (d) a parameter regarding software installed in the mobile terminal (200).

28 Claims, 20 Drawing Sheets

(51) Int. Cl.
*H04W 76/06* (2009.01)
*H04W 8/22* (2009.01)
*H04W 76/04* (2009.01)

(52) U.S. Cl.
CPC ....... *H04W 76/064* (2013.01); *H04W 76/068* (2013.01); *H04W 8/22* (2013.01); *H04W 52/0216* (2013.01); *H04W 76/046* (2013.01); *H04W 76/048* (2013.01)

(58) Field of Classification Search
CPC ............. H04W 76/046; H04W 76/048; H04W 76/064; H04W 76/068
USPC ......................................... 455/418, 419, 420
See application file for complete search history.

(56) References Cited

U.S. PATENT DOCUMENTS

| | | |
|---|---|---|
| 2005/0221823 A1 | 10/2005 | Noguchi et al. |
| 2008/0039032 A1* | 2/2008 | Haumont ................ H04W 8/22 455/115.1 |
| 2011/0199934 A1 | 8/2011 | Olofsson et al. |
| 2011/0300888 A1 | 12/2011 | Sakumoto |
| 2013/0301418 A1* | 11/2013 | Ding ................... H04W 76/046 370/241 |

FOREIGN PATENT DOCUMENTS

| | | |
|---|---|---|
| EP | 2 393 335 A2 | 12/2011 |
| JP | 11-313370 A | 11/1999 |
| JP | 2005-295232 A | 10/2005 |
| JP | 2011-254377 A | 12/2011 |

OTHER PUBLICATIONS

3GPP S2-120475, "Inactivity Timer Management Function," NTT Docomo and NEC, 3GPP TSG-SA2 Meeting #89, Vancouver, Canada, Feb. 6-10, 2012, (53 pages).

3GPP S2-120476, "Inactivity Timer Management Function," NTT Docomo and NEC, 3GPP TSG-SA2 Meeting #89, Vancouver, Canada, Feb. 6-10, 2012, (40 pages).

Partial Supplementary European Search Report issued in corresponding European Application No. 13813612.2, dated Jan. 21, 2016, 9 pages.

Extended European Search Report issued in corresponding European Patent Application No. 16202931.8, dated Feb. 7, 2017, 10 pages.

Etsi 3GPP LTE; Evolved Universal Terrestrial Radio Access (E-UTRA); Medium Access Control (MAC) protocol specification (3GPP TS 36.321 Version 10.4.0 Release 10), Jan. 1, 2012, pp. 1-55 (56 pages).

* cited by examiner

| STATE OF UE (FREQUENCY OF HANDOVER AND FREQUENCY OF CONNECTION TO MCN) | UE INACTIVITY TIMER EXPIRATION PERIOD |
|---|---|
| FREQUENCY OF HANDOVER $\geq$ FREQUENCY OF CONNECTION TO MCN | SHORT TERM |
| FREQUENCY OF HANDOVER $<$ FREQUENCY OF CONNECTION TO MCN | LONG TERM |

METHOD OF DETERMINING EXPIRATION PERIOD OF TIMER, NETWORK NODE, AND NON-TRANSITORY COMPUTER READABLE MEDIUM

CROSS-REFERENCE TO RELATED APPLICATIONS

This application is a national stage application of International Application No. PCT/JP2013/003364 entitled "Method of Determining Expiration Period of Timer, Network Node, and Non-Transitory Computer Readable Medium," filed on May 28, 2013, which claims the benefit of the priority of Japanese Patent Application No. 2012-153091, filed on Jul. 6, 2012, the disclosures of each of which are hereby incorporated by reference in their entirety.

TECHNICAL FIELD

The present invention relates to a mobile communication system, and more specifically, to an adjustment of a timer that measures duration of an inactive state during which a mobile terminal does not perform data communication.

BACKGROUND ART

Patent literature 1 discloses measuring, by a mobile terminal or a network (i.e., a base station or a gateway), duration time of an inactive state during which the mobile terminal does not perform communication, and causing the mobile terminal to transition to a sleep mode when the duration time exceeds a predetermined expiration period. Patent literature 1 further discloses measuring, by a mobile terminal or a network (i.e., a base station or a gateway), a frequency of communication of the mobile terminal, and changing the timer expiration period regarding the sleep mode transition based on the frequency of communication of the mobile terminal. Patent literature 1 further discloses changing the timer expiration period regarding the sleep mode transition based on remaining battery power of the mobile terminal.

Further, Non-patent literature 1 and 2 disclose that subscriber data managed by a Home Subscriber Server (HSS) includes configuration data of a UE inactivity timer in a 3rd Generation Partnership Project (3GPP) mobile communication system. The UE inactivity timer is a timer that measures duration time of an inactive state during which user data regarding a mobile terminal is not transmitted or received. The UE inactivity timer is (re)started by a base station, and is used to determine the change of state of the mobile terminal from a CONNECTED state to an IDLE state. The configuration data of the UE inactivity timer held by the HSS is transmitted to the base station from the HSS through a Mobility Management Entity (MME) in response to attach of the mobile terminal, location registration update, a service request or the like.

The following are definitions of the terms "CONNECTED state" and "IDLE state" used in this specification and Claims. The "IDLE state" means a state in which a mobile terminal does not continuously transmit or receive control signals for session management and mobility management to or from a mobile core network, and radio resources in a radio access network have been released. The radio access network is, for example, UTRAN or E-UTRAN. The mobile core network is, for example, a General Packet Radio Service (GPRS) packet core or an Evolved Packet Core (EPC). One example of the IDLE state is an EPS Connection Management IDLE (ECM-IDLE) state and a Radio Resource Control IDLE (RRC_IDLE) state of the 3GPP. In the RRC_IDLE, radio resources in the Evolved Universal Terrestrial Radio Access Network (E-UTRAN) have been released.

Meanwhile, the "CONNECTED state" means a state in which, as in an ECM-CONNECTED state and an RRC_CONNECTED state of the 3GPP stated above, radio resources at least for transmitting and receiving control signals (control messages) for session management and mobility management between the mobile terminal and the mobile core network are secured in a radio access network, and such a connection is established as to be able to transmit and receive control signals (control messages) between the mobile terminal and the mobile core network. In short, the "CONNECTED state" is a state in which the mobile terminal is connected to the mobile core network so as to be able to at least transmit and receive the control signals (control messages) for the session management and the mobility management. In other words, the "CONNECTED state" does not require a state in which a data bearer is configured for transmitting and receiving user data between the mobile terminal and an external packet data network (PDN). The "CONNECTED state" can also be called an "ACTIVE state".

Typically, the mobile core network manages the location of a mobile terminal which is in the CONNECTED state on a cell by cell basis, and manages the location of a mobile terminal which is in the IDLE state in units of location registration areas (e.g., tracking areas, routing areas) including a plurality of cells. When moved from one location registration area to another location registration area, the mobile terminal which is in the IDLE state transmits a message indicating an update of the location registration area to the mobile core network. The mobile core network transmits, upon arrival of downlink traffic (downlink data or incoming voice call) to the mobile terminal which is in the IDLE state, a paging signal to a paging area defined based on the location registration area.

CITATION LIST

Patent Literature

[Patent Literature 1] Japanese Unexamined Patent Application Publication No. 11-313370

Non Patent Literature

[Non-Patent Literature 1] 3GPP S2-120475, "Inactivity timer management function", NTT docomo and NEC, 3GPP TSG-SA2 Meeting #89, Vancouver, Canada, 6-10 Feb. 2012

[Non-Patent Literature 2] 3GPP S2-120476, "Inactivity timer management function", NTT docomo and NEC, 3GPP TSG-SA2 Meeting #89, Vancouver, Canada, 6-10 Feb. 2012

SUMMARY OF INVENTION

Technical Problem

The inventors of the present invention have examined an adjustment of an expiration period of a timer (e.g., UE inactivity timer stated above) used to determine a transition from a CONNECTED state to an IDLE state of a mobile terminal in order to adjust the number of control signals that should be processed by a mobile core network regarding a state transition (IDLE-CONNECTED transition) of a mobile terminal.

Many of recent mobile terminals including smartphones, which place importance on power saving, operate to release a radio connection immediately when there is no communication, and to cause the state of each of a radio resource management layer and an upper layer to transition to the IDLE state. Meanwhile, as a tendency for application programs that run on a mobile terminal, the number of application programs that periodically connects with a server to send and receive information is increasing. As a result, the recent mobile terminals operate to transit from the CONNECTED state to the IDLE state immediately after completion of communication and then transition to the CONNECTED state again immediately for an application that periodically performs communication. That is, the phenomenon in which a mobile terminal repeatedly transits between the IDLE state and the CONNECTED state (IDLE-CONNECTED transition) occurs in many cases. This causes a problem that the number of control signals to be processed by the mobile core network increases, resulting in an increase in a load on the mobile core network.

Patent literature 1 discloses changing an expiration period of a timer that measures duration time of an inactive state during which a mobile terminal does not perform communication according to a frequency of communication or remaining battery power of the mobile terminal. Patent literature 1, however, does not disclose using other indices to change the expiration period of the timer. Further, Non-patent literature 1 and 2 do not explicitly disclose which index is used to determine the expiration period of the UE inactivity timer.

An exemplary object of the present invention is to provide a method of determining an expiration period of a timer, a network node, and a program that are able to contribute to an adjustment of the number of control signals that should be processed by a mobile core network regarding a mobile terminal.

Solution to Problem

A first exemplary aspect includes a method of determining an expiration period of a timer. The timer is used to determine a transition from a CONNECTED state to an IDLE state of a mobile terminal connected to a mobile core network through a radio access network. The method includes determining the expiration period of the timer based on at least one of the following first to fourth parameters:

(a) a first parameter regarding a frequency of connection of the mobile terminal to the mobile core network;
(b) a second parameter regarding a load on control signal processing by a mobility management node arranged in the mobile core network;
(c) a third parameter regarding a frequency of movement of the mobile terminal between base stations; and
(d) a fourth parameter regarding software installed in the mobile terminal.

A second exemplary aspect includes a network node. The network node includes a determination unit that determines an expiration period of a timer based on a predetermined parameter. The timer is used to determine a transition from a CONNECTED state to an IDLE state of a mobile terminal connected to a mobile core network through a radio access network. The predetermined parameter includes at least one of the following first to fourth parameters:

(a) a first parameter regarding a frequency of connection of the mobile terminal to the mobile core network;
(b) a second parameter regarding a load on control signal processing by a mobility management node arranged in the mobile core network;
(c) a third parameter regarding a frequency of movement of the mobile terminal between base stations; and
(d) a fourth parameter regarding software installed in the mobile terminal.

The third exemplary aspect includes a program for causing a computer to perform the method according to the first exemplary aspect stated above.

Advantageous Effects of Invention

According to the exemplary aspects stated above, it is possible to provide a method of determining an expiration period of a timer, a network node, and a program that are able to contribute to an adjustment of the number of control signals that should be processed by a mobile core network regarding a mobile terminal.

DESCRIPTION OF EMBODIMENTS

Hereinafter, with reference to the drawings, specific embodiments of the present invention will be described in detail. Throughout the drawings, the identical and corresponding components are denoted by the same reference symbols, and overlapping descriptions will be omitted as appropriate for the sake of clarification of description.

First Exemplary Embodiment

Figure 1:
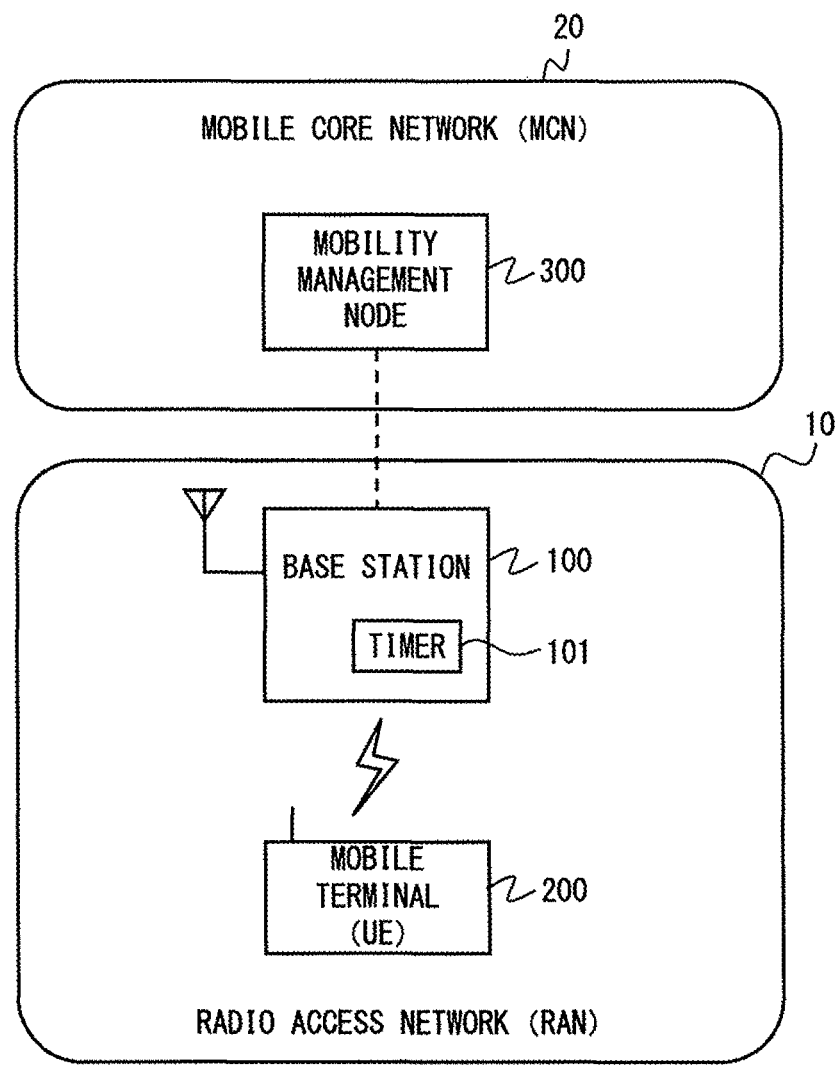
FIG. 1 is a block diagram showing a configuration example of a mobile communication system according to a first exemplary embodiment.

FIG. 1 is a block diagram showing a configuration example of a network including a mobility management node 300 according to this exemplary embodiment. The configuration example shown in FIG. 1 includes a radio access network (RAN) 10 and a mobile core network (MCN) 20. The basic configurations and functions of the RAN 10 and the MCN 20 will be described first.

The RAN 10 includes a base station 100 and a mobile terminal 200. The base station 100 is connected to the mobile terminal 200 by means of a radio access technology. The mobile terminal 200 has a radio interface, is connected to the base station 100 by means of the radio access technology, and is connected to the MCN 20 through the RAN 10 (i.e., base station 100). The RAN 10 is, for example, E-UTRAN or UTRAN, or the combination thereof. In the E-UTRAN, the base station 100 corresponds to an E-UTRAN NodeB (eNB). In the UTRAN, the base station 100 corresponds to the functions of a Node B and a Radio Network Controller (RNC).

In the example shown in FIG. 1, the base station 100 includes a UE inactivity timer 101. The UE inactivity timer 101 is a timer that measures duration time of an inactive state during which user data regarding the mobile terminal 200 is neither transmitted nor received. The UE inactivity timer 101 is (re)started by the base station 100, and is used to determine a change from the CONNECTED state to the IDLE state of the mobile terminal 200. The UE inactivity timer 101 may be arranged in another node arranged in the RAN 10.

The base station 100 (re)starts the UE inactivity timer for the mobile terminal 200 in response to scheduling downlink or uplink radio resources to the mobile terminal 200, for example. Further or alternatively, the base station 100 may (re)start the UE inactivity timer for the mobile terminal 200 in response to at least one of reception of downlink data for the mobile terminal 200, transmission of an uplink transmission grant (Uplink Grant) to the mobile terminal 200, transmission of a paging message to the mobile terminal 200, and reception of a radio resource allocation request from the mobile terminal 200.

When the UE inactivity timer 101 expires, the mobile terminal 200 makes a transition from the CONNECTED state to the IDLE state. For example, the base station 100 may request the MCN 20 (more specifically, the mobility management node 300) to release a bearer regarding the mobile terminal 200 in response to expiration of the UE inactivity timer 101, and may release a radio bearer that has been configured for the mobile terminal 200. The mobile terminal 200 may make a transition to the IDLE state in response to release of the radio bearer.

The MCN 20 is a network managed by an operator that provides mobile communication services. The MCN 20 is, for example, an EPC in an Evolved Packet System (EPS), a GPRS packet core in a Universal Mobile Telecommunications System (UMTS), or the combination thereof. The MCN 20 has a control plane function including bearer management and mobility management of the mobile terminal 200 and a user plane function including transfer of user data sent between the mobile terminal 200 and an external PDN 30. In the example shown in FIG. 1, the MCN 20 includes the mobility management node 300 as a control plane entity. Further, although not shown in the drawings, the MCN 20 includes at least one transfer node as a user plane entity. In the case of the UMTS, for example, the transfer node (not shown) includes a Gateway GPRS Support Node (GGSN) and user plane functions of a Serving GPRS Support Node (SGSN). Further, in the case of the EPS, the transfer node includes a Serving Gateway (S-GW) and a PDN Gateway (P-GW).

The mobility management node 300 performs mobility management and bearer management of the mobile terminal 200 (e.g., bearer establishment, bearer modification, bearer release). For example, in the case of the UMTS, the mobility management node 300 has control plane functions of a SGSN. Further, in the case of the EPS, the mobility management node 300 has a Mobility Management Entity (MME) function. The mobility management node (e.g., MME) 300 is connected to a plurality of base stations (e.g., eNBs) 100 with a control interface (e.g., S1-MME interface), and is connected to the transfer node (e.g., S-GW) with a control interface (e.g., S11 interface). The mobility management node 300 exchanges Non-Access Stratum (NAS) messages that are transmitted between the mobile terminal 200 and the MCN 20. The NAS messages are control messages that are not terminated at the RAN 10 and are transparently transmitted or received between the mobile terminal 200 and the MCN 20 without depending on the radio access technology used in the RAN 10. For example, in response to receiving from the mobile terminal 200 a service request message requesting resource allocation, the mobility management node 300 requests the base station 100 to establish a bearer with the MCN 20 and to establish a radio bearer with the mobile terminal 200.

In the following description, the mobility management node 300 according to this exemplary embodiment will be described further in detail. The mobility management node 300 determines an expiration period of the UE inactivity timer 101 based on a predetermined parameter. The predetermined parameter includes at least one of the following first to fourth parameters:

(a) a first parameter regarding a frequency of repetition of the connection of the mobile terminal 200 to the MCN 20 (hereinafter referred to as a frequency of connection);
(b) a second parameter regarding the load on control signal processing by the mobility management node 300;
(c) a third parameter regarding a frequency of movement of the mobile terminal 200 between the base stations 100; and
(d) a fourth parameter regarding software installed in the mobile terminal 200.

In general, the mobile terminal 200 that has completed the communication immediately makes a transition to the IDLE state, and radio resources of the RAN 10 are released and there is no need to perform handover of the mobile terminal 200, thereby reducing the load on the RAN 10 and the core network 20. However, when the mobile terminal 200 repeats the transition between the IDLE state and the CONNECTED state (IDLE-CONNECTED transition), the number of control signals that should be processed by the MCN 20 increases, which leads to a problem of an increase in the load on the MCN 20.

The control signals regarding the IDLE-CONNECTED transition are not only the control signals that should be processed by the MCN 20 regarding the mobile terminal 200. As already stated above, for example, upon occurrence of the handover of the mobile terminal 200, the mobility management node 300 and the transfer node (not shown) have to process control signals to change the path of the bearer in the MCN 20.

The first to third parameters stated above closely relate to the number of control signals that should be processed by the MCN 20 regarding the mobile terminal 200. Further, the fourth parameter may relate to the number of control signals that should be processed by the MCN 20 regarding the mobile terminal 200. The fourth parameter indicates, for example, the type or the version of the operating system (OS) installed in the mobile terminal 200. The frequency of communication of the mobile terminal 200 may vary depending on the type or the version (revision) of the OS installed in the mobile terminal 200. The fourth parameter is, for example, an International Mobile Equipment Identity Software Version (IMEISV). The IMEISV includes a double-digit Software Version Number (SVN) indicating the revision of the software installed in the mobile terminal 200. The change or the update of the OS of the mobile terminal 200 is restricted by a mobile operator, and may not be freely performed by a user. In such a case, a hardware identifier of the mobile terminal 200 may be associated with the type or the version of the OS. Accordingly, the fourth parameter may be, for example, an IMEI. In this exemplary embodiment, the expiration period of the UE inactivity timer 101 is changed based on at least one of the first to fourth parameters. It is therefore possible to efficiently adjust the number of control signals that should be processed by the MCN 20.

Since all of the first to third parameters stated above relate to the number of control signals, these parameters may be measured by a control node in a control plane (i.e., mobility management node 300) without using a transfer node in a user plane. Further, the fourth parameter is held in the mobile terminal 200, and is transmitted to a control node in the MCN 20 (e.g., mobility management node 300, subscriber server (not shown)) from the mobile terminal 200 by means of signaling associated with a mobility management event such as attach to the MCN 20 and update of the location registration area (e.g., tracking area). According to a typical architecture of the mobile core network, an update of the UE inactivity timer 101 is performed by the signaling on the control plane. Accordingly, when a parameter involving measurement of user data packets such as the frequency of communication of the mobile terminal 200 is used, exchange of unwanted control signals may be necessary between a transfer node in the user plane and a control node in the control plane to update the UE inactivity timer 101. Meanwhile, the first to fourth parameters stated above can be measured or acquired at the control node in the control plane (i.e., mobility management node 300), whereby it is possible to suppress such unwanted control signals.

In the following description, specific examples of the determination of the expiration period of the UE inactivity timer 101 using at least one of the first to fourth parameters will be described.

<First Parameter: Frequency of Connection to MCN 20>

The first parameter relates to the frequency of connection of the mobile terminal 200 to the MCN 20 (i.e., the number of connections to the MCN 20 per unit time). The first parameter may be either the frequency of connection to the MCN 20 or the (average) occurrence interval of the connection to the MCN 20. The mobility management node 300 may measure the number of connections to the MCN 20 that are performed by the mobile terminal 200 to change to the CONNECTED state. The mobility management node 300 may measure, for example, the number of times of occurrence, frequency of occurrence, or occurrence interval of a service request from the mobile terminal 200 in the IDLE state. Alternatively, the mobility management node 300 may measure the number of times of occurrence, frequency of occurrence, or occurrence interval of a service request (e.g., downlink data notification, or paging request) from the MCN 20 or the external network for the mobile terminal 200 in the IDLE state. Further alternatively, the mobility management node 300 may measure messages (e.g., attach requests) regarding an initial attach to the MCN 20 by the mobile terminal 200 together with the service requests stated above.

The mobility management node 300 may determine to increase the expiration period of the UE inactivity timer 101 when the frequency of connection of the mobile terminal 200 to the MCN 20 is relatively high compared to the case in which that is relatively low. In other words, the mobility management node 300 may determine to increase the expiration period of the UE inactivity timer 101 as the frequency of connection of the mobile terminal 200 to the MCN 20 becomes high. Further, in other words, the mobility management node 300 may determine to increase the expiration period of the UE inactivity timer 101 when the frequency of connection of the mobile terminal 200 to the MCN 20 exceeds a predetermined threshold compared to the case in which that is below the predetermined threshold. That the frequency of connection of the mobile terminal 200 to the MCN 20 is high directly indicates that the frequency of the IDLE-CONNECTED transition of the mobile terminal 200 is high. By increasing the expiration period of the UE inactivity timer 101, the time during which the mobile terminal 200 remains in the CONNECTED state can be increased. It is therefore expected that the frequency of connection to the MCN 20 decreases and thus the number of control signals that should be processed by the mobility management node 300 decreases.

When the time during which the mobile terminal 200 remains in the CONNECTED state increases, time during which the mobile terminal 200 is active (active time) increases, resulting in an increase in the battery consumption of the mobile terminal 200. In such a case, the DRX cycle (discontinuous reception cycle) of the mobile terminal 200 may be set longer. It is therefore possible to reduce the battery consumption of the mobile terminal 200. Alternatively, the DRX inactivity timer of the mobile terminal 200 may be set shorter. The mobile terminal 200 then immediately makes a transition to the DRX state, and time during which the mobile terminal 200 remains in a continuous reception state can be shortened, thereby reducing the power consumption in the mobile terminal 200 which is in the CONNECTED state. Further, the DRX cycle of the mobile terminal 200 may be set longer and the DRX inactivity timer of the mobile terminal 200 may be set shorter. It is therefore possible to further enhance the effect of reducing the power consumption in the mobile terminal 200.

The DRX inactivity timer is managed by the mobile terminal 200 which is in the CONNECTED state, and defines an ON-duration in the CONNECTED state. To be more specific, the mobile terminal 200 (re)starts the DRX inactivity timer in response to reception of the scheduling. The duration until the DRX inactivity timer expires is called an ON-duration. In the ON-duration, the mobile terminal 200 continuously receives all the sub-frames. When the DRX inactivity timer expires, the mobile terminal 200 makes a transition to a DRX cycle (specifically, short DRX cycle). That is, the DRX inactivity timer measures an inactive time until the mobile terminal 200 which is in the CONNECTED state (i.e., RRC_CONNECTED state) makes a transition from the continuous reception state to the DRX state.

Further, the mobility management node 300 may adjust the expiration period of the UE inactivity timer 101 according to the (average) occurrence interval of the connection to the MCN 20 by the mobile terminal 200. The mobility management node 300 may set, for example, the expiration period of the UE inactivity timer 101 regarding the mobile terminal 200 to be longer than the (average) occurrence interval of the connection to the MCN 20 by the mobile terminal 200. It is therefore expected that the frequency of the IDLE-CONNECTED transition of the mobile terminal 200 decreases and thus the number of control signals that should be processed by the mobility management node 300 decreases.

Figure 2:
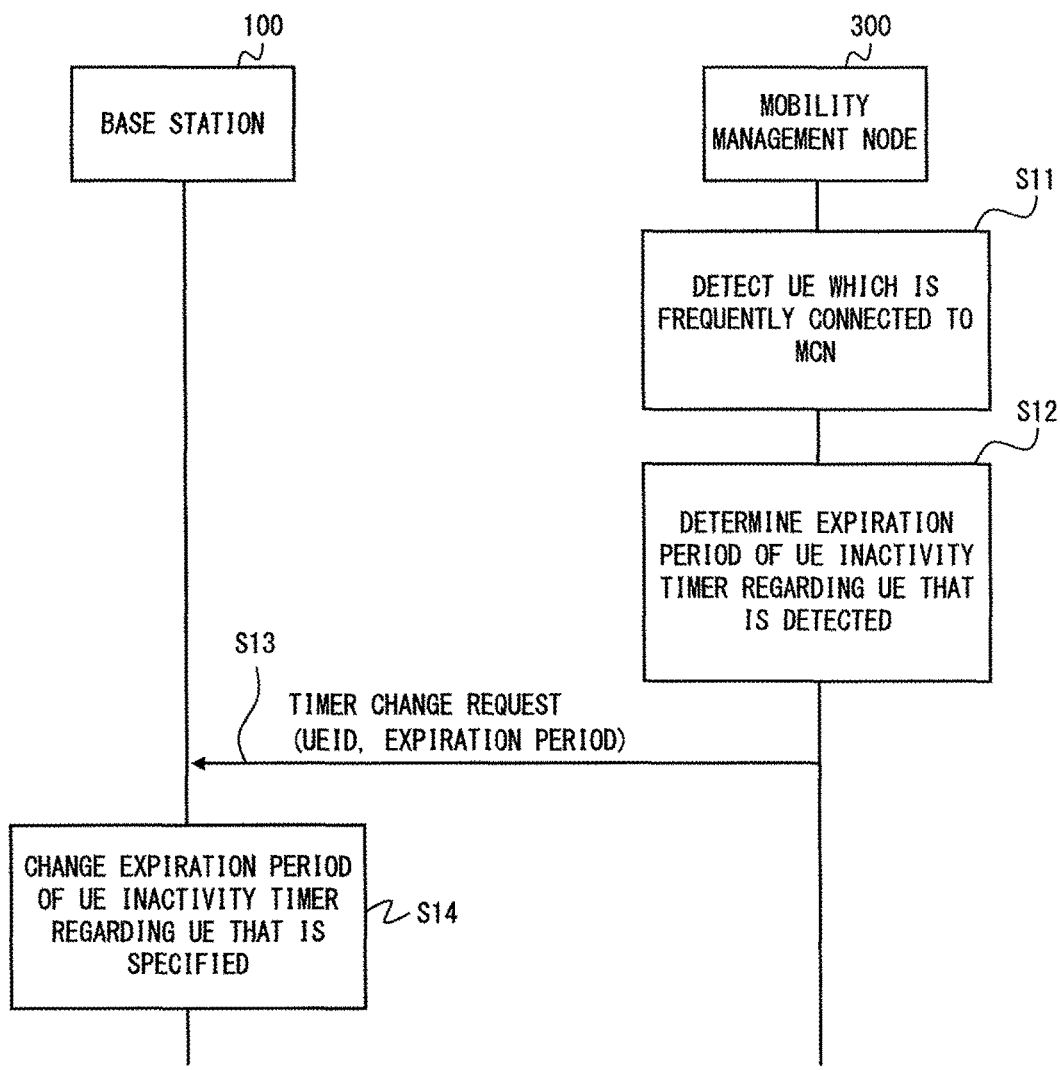
FIG. 2 is a sequence diagram showing an operation of the mobile communication system according to the first exemplary embodiment.

FIG. 2 is a sequence diagram showing one example of an operation for determining the expiration period of the UE inactivity timer 101 using the first parameter. In Step S11, the mobility management node 300 detects the mobile terminal 200 which is frequently connected to the MCN 20. In Step S12, the mobility management node 300 determines the expiration period of the UE inactivity timer 101 regarding the detected mobile terminal 200. In Step S13, the mobility management node 300 transmits a timer change request to a node in the RAN 10 that executes the UE inactivity timer 101 (i.e., the base station 100). The timer change request includes an identifier (UE Identifier (UEID)) of the target mobile terminal 200, and configuration information indicating the expiration period of the UE inactivity timer 101. In Step S14, the base station 100 changes, based on the timer change request, the expiration period of the UE inactivity timer 101 regarding the mobile terminal 200 that is specified by the request.

<Second Parameter: Load on Control Signal Processing by Mobility Management Node 300>

The second parameter relates to the load on the control signal processing by the mobility management node 300. The second parameter may be, for example, the frequency of occurrence (i.e., the number of occurrence per unit time) of the control signal processed by the mobility management node 300 regarding the plurality of mobile terminals 200. The mobility management node 300 may measure, for example, the number of times of occurrence, frequency of occurrence, or occurrence interval of the service request from the mobile terminal 200 in the IDLE state. The mobility management node 300 may measure the processing load on the control signal regarding the initial attach to the MCN 20 by the mobile terminal 200 together with the processing load on the control signal regarding the service request described above. Further, the mobility management node 300 may measure the processing load on the control signal regarding the handover of the mobile terminal 200 as well. Furthermore, the mobility management node 300 may measure the processing load on all the control signals processed in the mobility management node 300.

In response to detecting that the load on the mobility management node 300 is relatively high, the mobility management node 300 may collectively request one or a plurality of base stations 100 to increase the expiration period of the UE inactivity timer 101 of the plurality of mobile terminals 200. In other words, the mobility management node 300 may collectively increase the expiration period of the UE inactivity timer 101 applied to the plurality of mobile terminals 200 connected to one or a plurality of base stations 100 as the processing load on the control signal of the mobility management node 300 increases. In other words, the mobility management node 300 may determine to increase the expiration period of the UE inactivity timer 101 applied to the plurality of mobile terminals 200 connected to one or a plurality of base stations 100 when the load on the mobility management node 300 exceeds a predetermined threshold compared to the case in which that is below the threshold. By increasing the expiration period of the UE inactivity timer 101, the time during which the mobile terminal 200 remains in the CONNECTED state can be increased. It is therefore expected that the frequency of connection of each mobile terminal 200 to the MCN 20 decreases and thus the number of control signals that should be processed by the mobility management node 300 decreases. Further, by concurrently requesting the plurality of base stations 100 to change the expiration period of the UE inactivity timer 101, the number of control signals that should be processed by the mobility management node 300 can be efficiently reduced.

The change of the expiration period of the UE inactivity timer 101 may be performed on one, a part, or all of the plurality of base stations 100 connected to the mobility management node 300. For example, the mobility management node 300 may preferentially select one or some of base stations 100 which frequently communicates with the mobility management node 300 as the target of the change of the UE inactivity timer 101.

Figure 3:
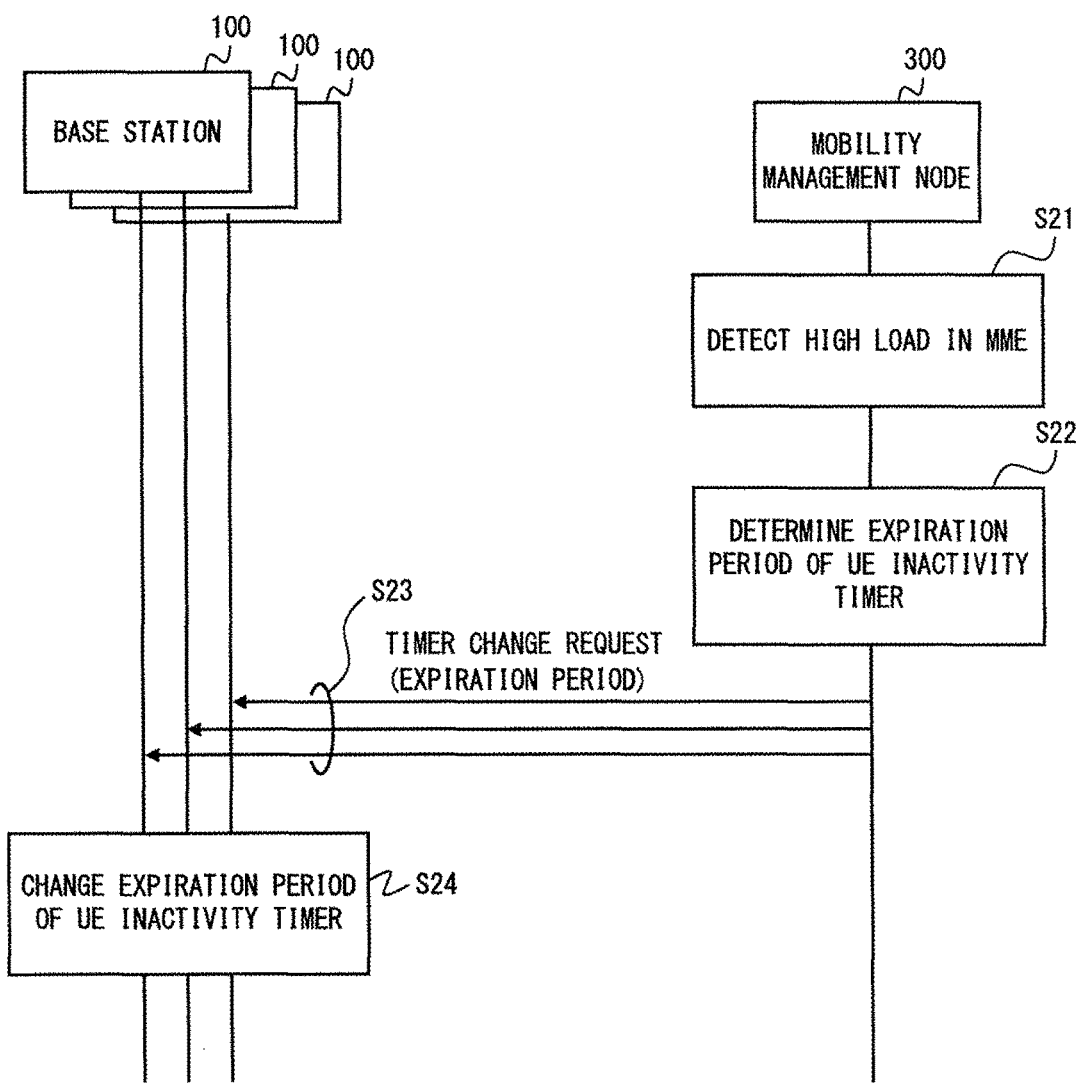
FIG. 3 is a sequence diagram showing an operation of the mobile communication system according to the first exemplary embodiment.

FIG. 3 is a sequence diagram showing one example of an operation for determining the expiration period of the UE inactivity timer 101 using the second parameter. In Step S21, the mobility management node 300 detects a high load in the mobility management node 300. In Step S22, the mobility management node 300 determines the expiration period of the UE inactivity timer 101 so as to decrease the load on the mobility management node 300 (e.g., the number of control signals). In Step S13, the mobility management node 300 transmits a timer change request to a plurality of base stations 100. The timer change request includes configuration information indicating the expiration period of the UE inactivity timer 101. In Step S24, each of the base stations 100 changes, based on the timer change request, the expiration period of the UE inactivity timer 101 regarding all the mobile terminals 200 connected to the respective cells of the base stations 100.

<Third Parameter: Frequency of Movement of Mobile Terminal 200>

The third parameter relates to the frequency of movement of the mobile terminal 200 between the base stations 100 (i.e., the number of times that the mobile terminal 200 moves between the base stations 100 per unit time). In this example, the movement of the mobile terminal 200 which is in the CONNECTED state between the base stations 100 (i.e., handover) may be taken into account. The third parameter may be either the frequency or the (average) occurrence interval of the handover of the mobile terminal 200 between the base stations 100. The mobility management node 300 may measure the number of times of signaling between the base station 100 and the mobility management node 300 that occurs when the mobile terminal 200 which is in the CONNECTED state performs a handover between the base stations 100.

The mobility management node 300 may determine to decrease the expiration period of the UE inactivity timer 101 when the frequency of handover of the mobile terminal 200 is relatively high compared to the case in which that is relatively low. In other words, the mobility management node 300 may determine to decrease the expiration period of the UE inactivity timer 101 with increasing the frequency of handover of the mobile terminal 200. In other words, the mobility management node 300 may determine to decrease the expiration period of the UE inactivity timer 101 when the frequency of handover of the mobile terminal 200 exceeds a predetermined threshold compared to the case in which that is below the threshold. That the frequency of handover of the mobile terminal 200 in the CONNECTED state is high means that the number of control signals which should be processed by the mobility management node 300 associated with the handover is large. The frequency of handover occurrence decreases by reducing the expiration period of the UE inactivity timer 101 and the time during which the mobile terminal 200 remains in the CONNECTED state. As already stated above, the mobile terminal 200 in the IDLE state performs an autonomous cell re-selection in place of a handover, and the location of the mobile terminal 200 is managed by the mobility management node 300 in units of location registration areas (tracking areas). It is therefore expected that the frequency of handover occurrence decreases, which causes a decrease in the number of control signals that should be processed by the mobility management node 300.

Alternatively, the mobility management node 300 may adjust the expiration period of the UE inactivity timer 101 according to the average handover occurrence interval of the mobile terminal 200 which is in the CONNECTED state. For example, the mobility management node 300 may set the expiration period of the UE inactivity timer 101 regarding the mobile terminal 200 to be shorter than the average handover occurrence interval of the mobile terminal 200. It is therefore expected that the frequency of handover of the mobile terminal 200 decreases, which causes a decrease in the number of control signals that should be processed by the mobility management node 300.

Figure 4:
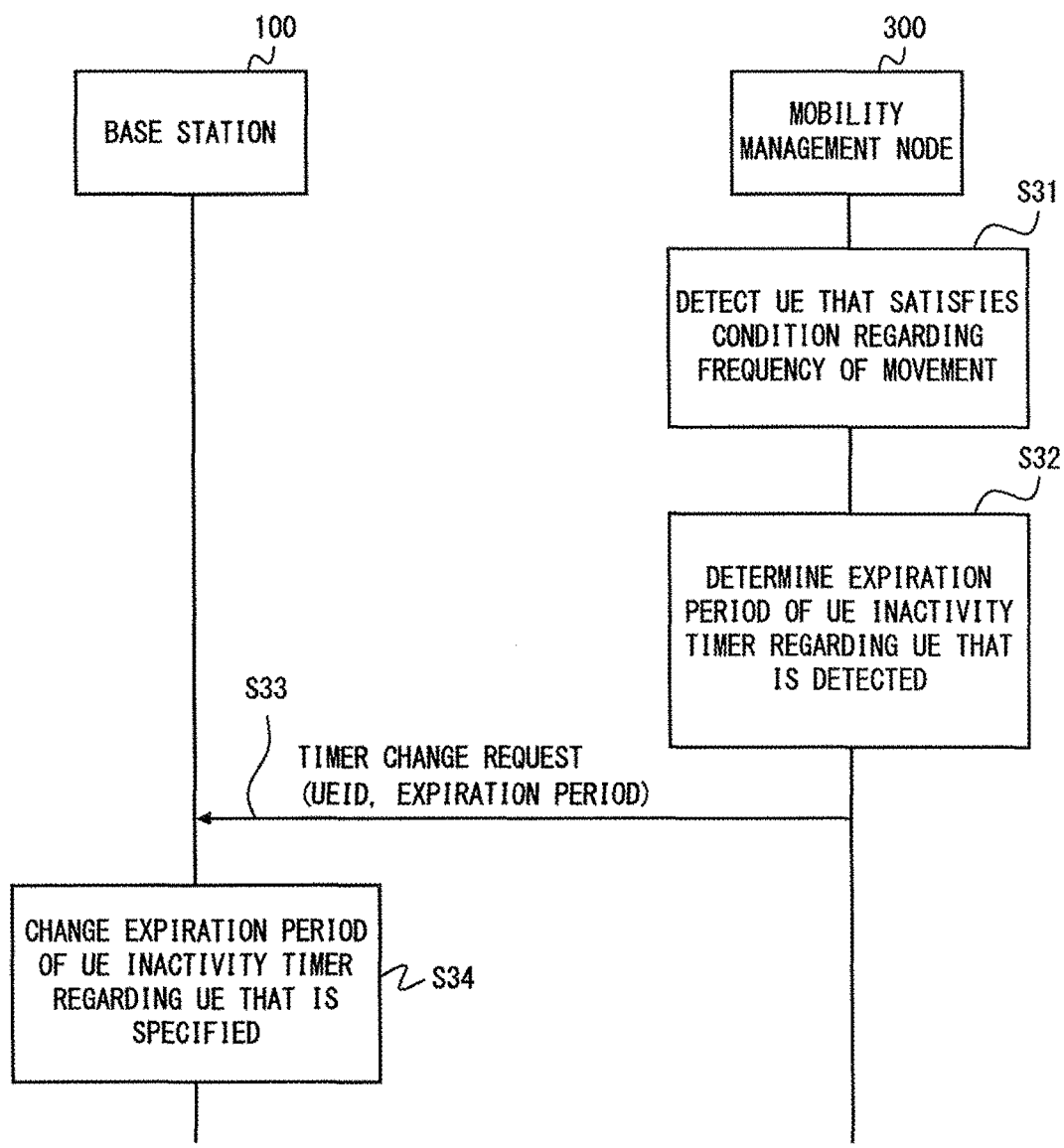
FIG. 4 is a sequence diagram showing an operation of the mobile communication system according to the first exemplary embodiment.

FIG. 4 is a sequence diagram showing one example of an operation for determining the expiration period of the UE inactivity timer 101 using the third parameter. In Step S31, the mobility management node 300 detects the mobile terminal 200 which satisfies the condition regarding the frequency of movement (e.g., the frequency of handover is equal to or larger than a threshold). In Step S32, the mobility management node 300 determines the expiration period of the UE inactivity timer 101 regarding the detected mobile terminal 200. In Step S33, the mobility management node 300 transmits a timer change request to the base station 100 that executes the UE inactivity timer 101. The timer change request includes an identifier (UEID) of the target mobile terminal 200, and configuration information indicating the expiration period of the UE inactivity timer 101. In Step S34, the base station 100 changes, based on the timer change request, the expiration period of the UE inactivity timer 101 regarding the mobile terminal 200 that is specified by the request.

<Fourth Parameter: Software Information of Mobile Terminal 200>

The fourth parameter relates to software installed in the mobile terminal 200. As described above, the fourth parameter may be software information (e.g., SVN of IMEISV) indicating type or version (revision) of software installed in the mobile terminal 200. The fourth parameter may be a hardware identifier (e.g., IMEI) of the mobile terminal 200. The software information of the mobile terminal 200 is typically held in the mobile terminal 200. Therefore, the mobility management node 300 may acquire the software information of the mobile terminal 200 transmitted from the mobile terminal 200 when the mobility management event such as attach of the mobile terminal 200 or update of the location registration area occurs.

The mobility management node 300 may determine to increase the expiration period of the UE inactivity timer 101 when the software information of the mobile terminal 200 accords with a predetermined content (e.g., code, number) associated with high frequency of communication. That the frequency of communication of the mobile terminal 200 is high directly indicates that the frequency of the IDLE-CONNECTED transition of the mobile terminal 200 is high. By increasing the expiration period of the UE inactivity timer 101, the time during which the mobile terminal 200 remains in the CONNECTED state can be increased. It is therefore expected that the frequency of connection to the MCN 20 of the mobile terminal 200 that has high frequency of communication decreases, which causes a decrease in the number of control signals that should be processed by the mobility management node 300. Further or alternatively, the mobility management node 300 may determine to decrease the expiration period of the UE inactivity timer 101 when the software information of the mobile terminal 200 accords with a predetermined content (e.g., code, number) associated with low frequency of communication.

Figure 5:
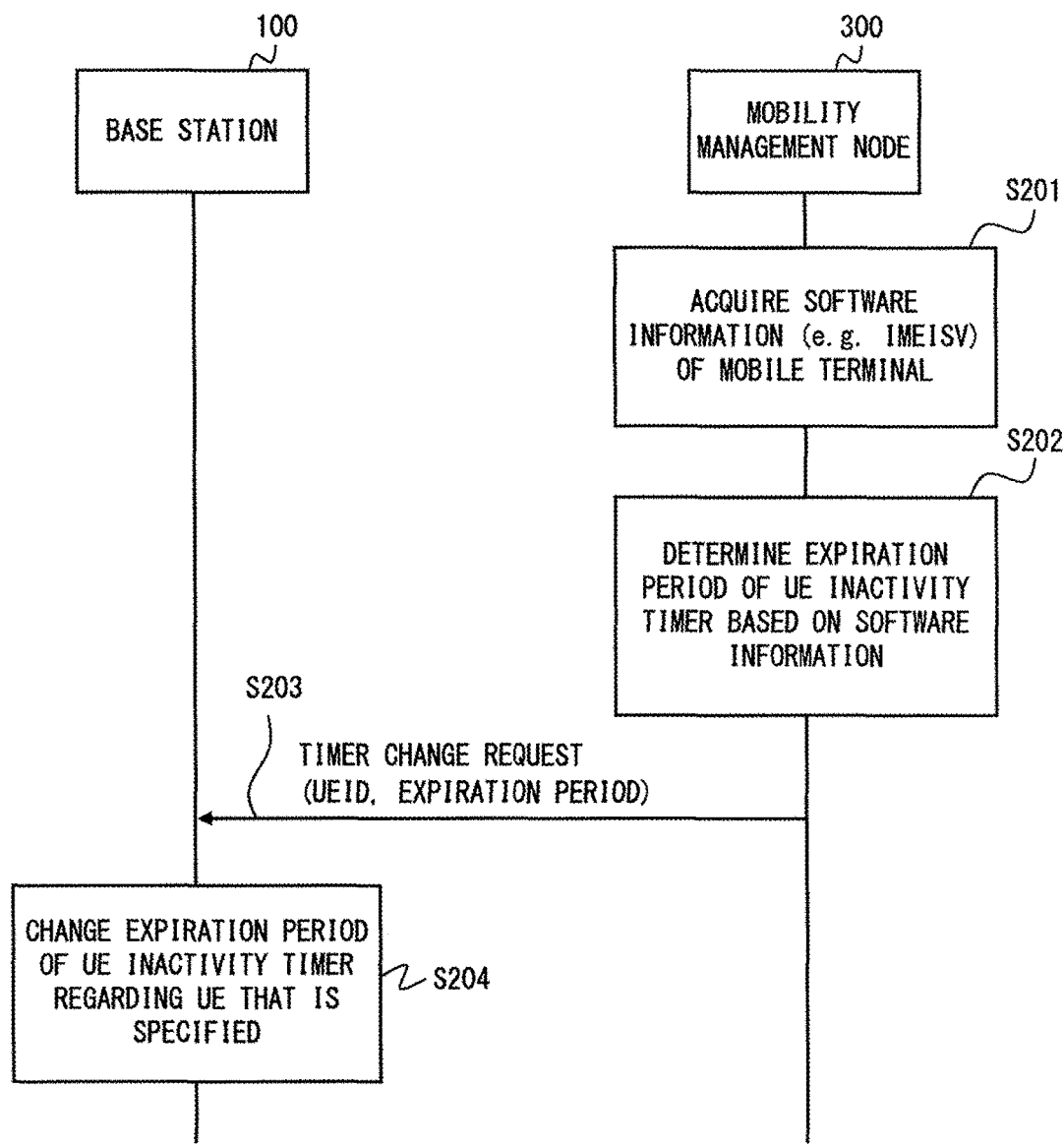
FIG. 5 is a sequence diagram showing an operation of the mobile communication system according to the first exemplary embodiment.

FIG. 5 is sequence diagram showing one example of an operation for determining the expiration period of the UE inactivity timer 101 using the second parameter. In Step S201, the mobility management node 300 acquires software information (e.g., IMEISV) of the mobile terminal 200. In Step S202, the mobility management node 300 determines the expiration period of the UE inactivity timer 101 applied to the mobile terminal 200 based on the software information of the mobile terminal 200. In Step S203, the mobility management node 300 transmits a timer change request to the base station 100 which executes the UE inactivity timer 101. The timer change request includes an identifier (UEID) of the target mobile terminal 200, and configuration information indicating the expiration period of the UE inactivity timer 101. In Step S204, the base station 100 changes, based on the timer change request, the expiration period of the UE inactivity timer 100 regarding the mobile terminal 200 that is specified by the request.

The mobility management node 300 may use the first to fourth parameters stated above in combination as necessary. The mobility management node 300 may use at least one of the first to fourth parameters and another parameter (e.g., frequency of communication of the mobile terminal 200) in combination. In the following description, an example of using the first parameter and the third parameter stated above in combination and an example of using the third parameter and another parameter (e.g., frequency of communication of the mobile terminal 200) in combination will be described.

The number of control signals regarding the IDLE-CONNECTED transition of the mobile terminal 200 and the number of control signals regarding the handover of the mobile terminal 200 are in a contradictory relationship regarding the length of the expiration period of the UE inactivity timer 101. It is expected that the number of control signals that should be processed by the MCN 20 regarding the IDLE-CONNECTED transition of the mobile terminal 200 can be reduced by increasing the expiration period of the UE inactivity timer 101. This is because it is possible to increase the time during which the mobile terminal 200 remains in the CONNECTED state. Meanwhile, the number of control signals that should be processed by the MCN 20 regarding the handover of the mobile terminal 200 may increase by increasing the expiration period of the UE inactivity timer 101. This is because the mobile terminal 200 in the CONNECTED state moves between the base stations 100 by a handover.

Accordingly, the mobility management node 300 may determine the expiration period of the UE inactivity timer 101 in consideration of both the first parameter regarding the frequency of connection of the mobile terminal 200 to the MCN 20 and the third parameter regarding the frequency of handover. For example, the mobility management node 300 may determine the expiration period as shown in the table in FIG. 6. In the example shown in FIG. 6, the mobility management node 300 decreases the expiration period of the UE inactivity timer 101 when the frequency of handover of the mobile terminal 200 is higher than the frequency of connection of the mobile terminal 200 to the MCN 20 compared to the case in which the frequency of handover of the mobile terminal 200 is equal to or lower than the frequency of connection of the mobile terminal 200 to the MCN 20. It is therefore possible to preferentially reduce the number of control signals due to handover of the mobile terminal 200 compared to the number of control signals due to repetition of connection to the MCN 20. On the other hand, the mobility management node 300 increases the expiration period of the UE inactivity timer 101 when the frequency of handover of the mobile terminal 200 is lower than the frequency of connection of the mobile terminal 200 to the MCN 20 compared to the case in which the frequency of handover of the mobile terminal 200 is equal to or higher than the frequency of connection of the mobile terminal 200 to the MCN 20. It is therefore possible to preferentially reduce the number of control signals due to repetition of connection to the MCN 20 by the mobile terminal 200 compared to the number of control signals due to handover.

Figures 6, 7:
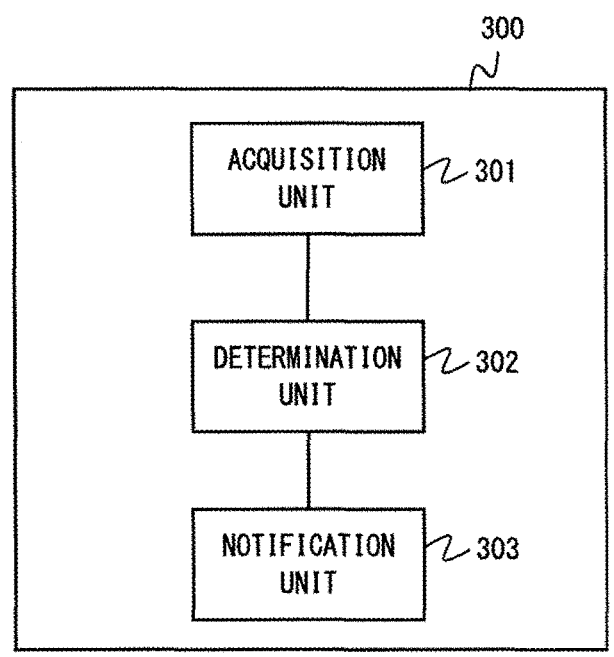
FIG. 6 is a table showing a specific example of parameters for determining an expiration period of a UE INACTIVITY TIMER.
FIG. 7 is a block diagram showing a configuration example of a mobility management node according to the first exemplary embodiment.

Instead of using the first parameter described in the example shown in FIG. 6 (i.e., frequency of connection of the mobile terminal 200 to the MCN 20), another parameter indicating the frequency of communication (i.e., the number of times of communication per unit time) of the mobile terminal 200 may be used. The parameter indicating the frequency of communication of the mobile terminal 200 may be the average communication interval of the mobile terminal 200. That is, the mobility management node 300 may decrease the expiration period of the UE inactivity timer 101 when the frequency of handover of the mobile terminal 200 is higher than the frequency of communication of the mobile terminal 200 compared to the case in which the frequency of handover of the mobile terminal 200 is equal to or lower than the frequency of communication of the mobile terminal 200.

In the following description, a configuration example of the mobility management node 300 will be described. FIG. 7 is a block diagram showing the configuration example of the mobility management node 300. An acquisition unit 301 acquires at least one of the first to fourth parameters. As already stated above, the first to fourth parameters can be measured or acquired by the mobility management node 300. Accordingly, the acquisition unit 301 may measure or acquire at least one of the first to fourth parameters. The acquisition unit 301, however, may receive at least one of the first to fourth parameters measured or acquired by another node from the node. The determination unit 302 determines the expiration period of the UE inactivity timer 101 based on at least one of the first to fourth parameters. A determination unit 302 may determine the expiration period of the UE inactivity timer 101 according to any one of determination methods already described above. A notification unit 303 communicates with the base station 100, and transmits the configuration information indicating the expiration period of the UE inactivity timer 101 to the base station 100.

The mobility management node 300 may be implemented by causing a computer system including at least one processor to execute a program. To be more specific, one or a plurality of programs including instructions to cause the computer system to perform the algorithm regarding the mobility management node 300 described with reference to FIGS. 1 to 7 may be supplied to the computer.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 8:
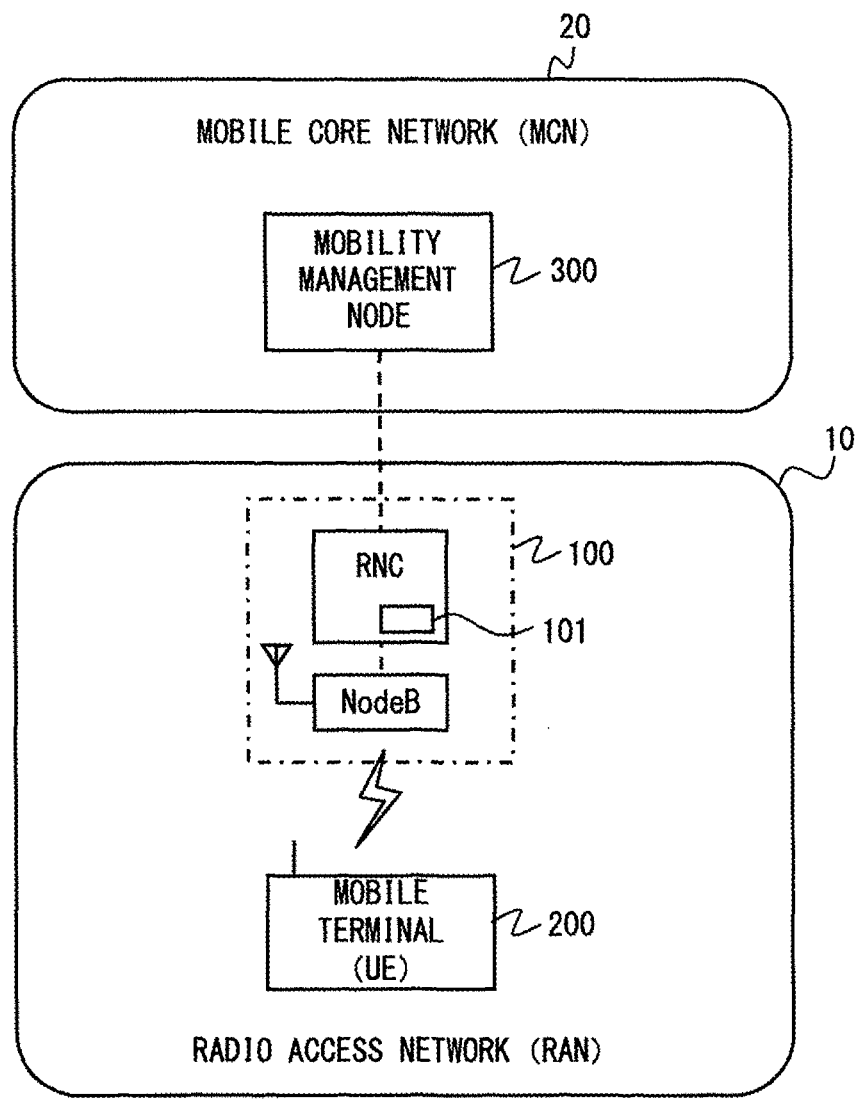
FIG. 8 is a block diagram showing a configuration example of the mobile communication system according to the first exemplary embodiment.

As already stated above, in the case of the UMTS, the base station 100 shown in FIG. 1 includes functions of an RNC and a NodeB. FIG. 8 shows a configuration example of a UMTS network. As shown in FIG. 8, the UE inactivity timer 101 may be arranged in the RNC. The mobility management node 300 shown in FIG. 8 corresponds to the control plane functions of the SGSN.

Second Exemplary Embodiment

Described in this exemplary embodiment is an example in which a subscriber server acquires the fourth parameter stated above (i.e., information regarding the software installed in the mobile terminal 200) and the configuration of the UE inactivity timer 101 applied to the mobile terminal 200 is changed based on the information.

Figure 9:
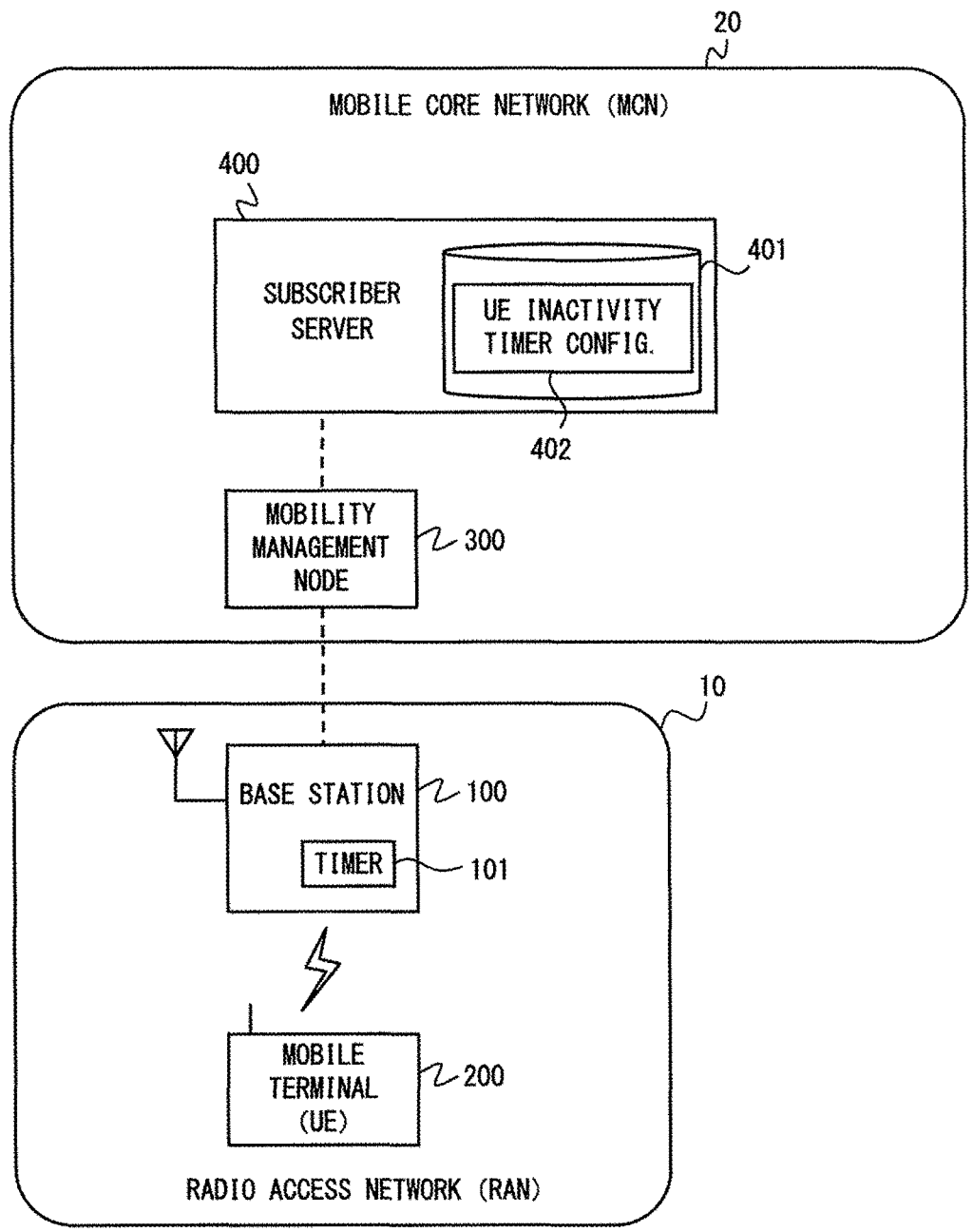
FIG. 9 is a block diagram showing a configuration example of a mobile communication system according to a second exemplary embodiment.

FIG. 9 is a block diagram showing a configuration example of a network including a mobile terminal 200, a mobility management node 300, and a subscriber server 400 according to this exemplary embodiment.

The subscriber server 400 manages a subscriber data 401 regarding the mobile terminal 200. In the case of the UMTS, for example, the subscriber server 400 has functions of a Home Location Register (HLR). In the case of the EPS, the subscriber server 400 has functions of an HSS. The subscriber data 401 managed by the subscriber server (e.g., HSS) 400 includes, for example, QoS information, information regarding a PDN to which the mobile terminal 200 can connect, and the IP address of the mobile terminal 200. The QoS information includes, for example, QoS parameters of a data bearer (e.g., QCI). The information regarding the PDN includes, for example, an APN indicating the name of the PDN, or the Internet Protocol (IP) address of the PDN. Further, the subscriber data may include radio control parameters of the RAN 10 regarding the mobile terminal 200. One example of the radio control parameters is a configuration data 402 of the UE inactivity timer 101. The subscriber server 400 transmits and receives control signals to and from the mobility management node 300, in response to attach, location update, a service request and the like of the mobile terminal 200, in order to supply the subscriber data of the mobile terminal 200 to the mobility management node 300 and to acquire information of the mobility management node 300 where the mobile terminal 200 is currently registered.

Figure 10:
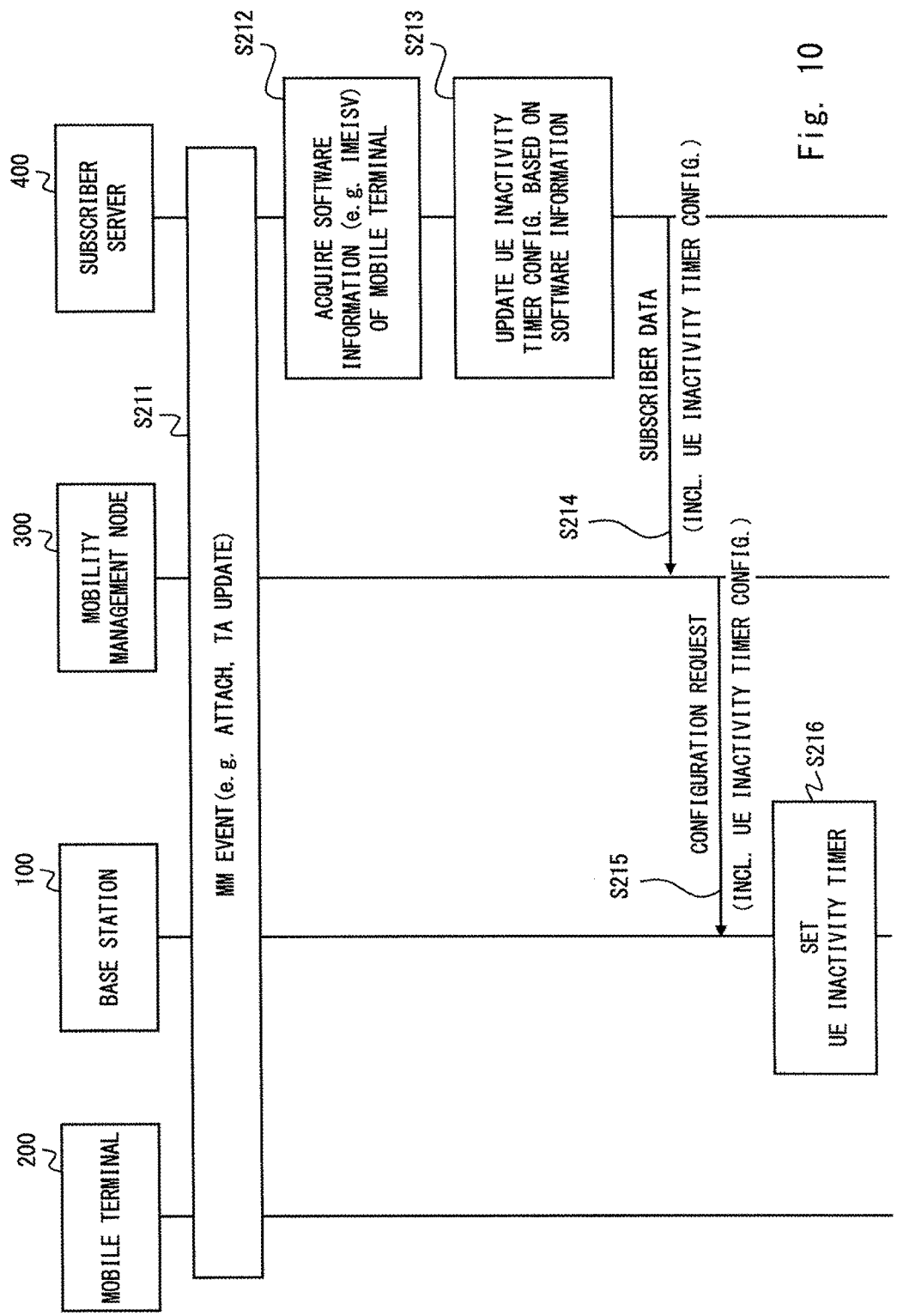
FIG. 10 is a sequence diagram showing an operation of the mobile communication system according to the second exemplary embodiment.

FIG. 10 is a sequence diagram showing one example of communication to update the expiration period of the UE inactivity timer 101 according to this exemplary embodiment. In Step S211, some mobility management event is performed such as attach of the mobile terminal 200 to the MCN 20 or update of the tracking area of the mobile terminal 200. In Step S212, the subscriber server 400 acquires software information (e.g., IMEISV) of the mobile terminal 200 transmitted from the mobile terminal 200 when the mobility management event is performed (Step S211).

In Step S213, the subscriber server 400 updates, based on the software information of the mobile terminal 200, the configuration data 402 (i.e., time until when the timer expires) of the UE inactivity timer 101 included in the subscriber data 401. Similar to the description in the first exemplary embodiment, the subscriber server 400 may increase the expiration period of the UE inactivity timer 101 when, for example, the software information of the mobile terminal 200 accords with a predetermined content (e.g., code, number) associated with high frequency of communication. Further or alternatively, the subscriber server 400 may determine to decrease the expiration period of the UE inactivity timer 101 when the software information of the mobile terminal 200 accords with a predetermined content (e.g., code, number) associated with low frequency of communication.

In Step S214, by signaling between the subscriber server 400 and the mobility management node 300 associated with the mobility management event in Step S211, the subscriber data 401 of the mobile terminal 200 is transmitted to the mobility management node 300. In the example shown in FIG. 10, the subscriber data 401 includes the configuration data 402 of the UE inactivity timer 101. In Step S215, by signaling between the base station 100 and the mobility management node 300 associated with the mobility management event in Step S212, a configuration request including the configuration data 402 of the UE inactivity timer 101 is transmitted to the base station 100. In Step S216, the base station 100 sets the UE inactivity timer 101 in accordance with the configuration data 402 received from the mobility management node 300.

According to this exemplary embodiment, the subscriber server 400 is able to determine the expiration period of the UE inactivity timer 101 based on the fourth parameter (i.e., information regarding the software installed in the mobile terminal 200).

Other Exemplary Embodiments

The determination of the expiration period of the UE inactivity timer 101 applied to the mobile terminal 200 may be performed based on a fifth or sixth parameter described below in place of the first to fourth parameters described above or in combination with any one of the first to fourth parameters:

(e) a fifth parameter regarding a processing load on the base station 100; and
(f) a sixth parameter regarding the frequency of communication (or the frequency of connection) between the base station 100 and the mobility management node 300.

The measurement of the fifth and sixth parameters may be performed either by the base station 100 or by the mobility management node 300. Further, the determination of the expiration period of the UE inactivity timer 101 may be performed either by the base station 100 or by the mobility management node 300. When the fifth parameter or the sixth parameter exceeds a predetermined threshold the base station 100 or the mobility management node 300 may determine to increase the expiration period of the UE inactivity timer 101 applied to one or a plurality of mobile terminals 200 connected to the base station 100. By increasing the expiration period of the UE inactivity timer 101, the time during which the mobile terminal 200 remains in the CONNECTED state can be increased. It is therefore expected that the number of control signals that should be processed by the mobility management node 300 or the base station 100, which has large processing load or frequency of communication, decreases.

Further, the present invention is not limited to the embodiments stated above, and it will be obvious that various modifications may be made therein without departing from the spirit of the present invention described above.

In the following description, first to fourth reference embodiments will be described. The technical ideas that will be understood from the first to fourth reference embodiments described below contribute to the solution of problems different from the problem solved by the technical ideas that would be understood from the exemplary embodiments stated above, and can be executed independently from the technical ideas that would be understood from the exemplary embodiments stated above.

Patent literature 1 discloses that any one of a mobile terminal, a base station, and a gateway may measure inactive duration of the mobile terminal using a timer, and also discloses that any one of a mobile terminal, a base station, and a gateway may measure a frequency of communication of the mobile terminal and change the expiration period of the timer. Patent literature 1, however, does not disclose the details regarding which node performs measurement of the frequency of communication of the mobile terminal in a mobile communication network (e.g., UMTS, EPS) including a RAN and a MCN and which node determines the expiration period of the timer based on the measurement result. In the first to fourth reference embodiments described below, these details that are not specifically disclosed in Patent literature 1 will be described.

First Reference Embodiment

Figure 11:
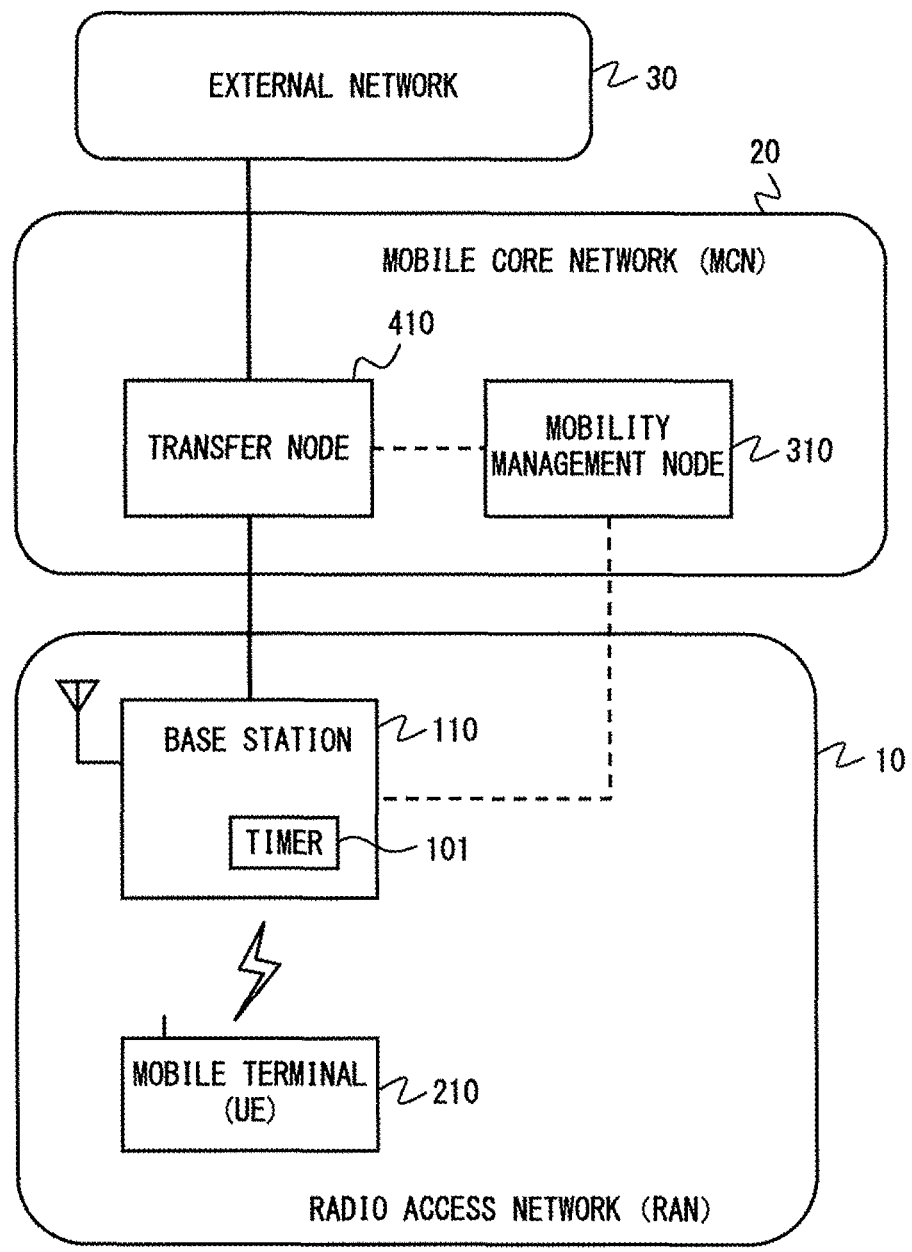
FIG. 11 is a block diagram showing a configuration example of a mobile communication system according to a first reference embodiment.

FIG. 11 is a block diagram showing a configuration example of a mobile communication system according to a first reference embodiment. The configuration example shown in FIG. 11 includes a radio access network (RAN) 10, a mobile core network (MCN) 20, and an external network 30.

The RAN 10 includes a base station 110 and a mobile terminal 210. In the E-UTRAN, the base station 110 corresponds to an eNB. In the UTRAN, the base station 110 corresponds to the functions of an RNC and a NodeB. The base station 110 includes a UE inactivity timer 101. The UE inactivity timer 101 is a timer that measures duration time of an inactive state during which user data regarding the mobile terminal 200 is neither transmitted nor received. The UE inactivity timer 101 is (re)started by the base station 110, and is used to determine change from the CONNECTED state to the IDLE state of the mobile terminal 210.

The MCN 20 includes a mobility management node 310 as a control plane entity. The mobility management node 310 performs mobility management and bearer management of the mobile terminal 200 (e.g., bearer establishment, bearer modification, bearer release). In the case of the UMTS, for example, the mobility management node 310 has control plane functions of an SGSN. Further, in the case of the EPS, the mobility management node 310 has an MME function.

Further, the MCN 20 includes at least one transfer node 410 as a user plane entity. The transfer node 410 transfers user data packets regarding the mobile terminal 200 between the RAN 10 and the external network 30. In the case of the UMTS, for example, at least one transfer node 410 has a Gateway GPRS Support Node (GGSN) and control plane functions of a Serving GPRS Support Node (SGSN). Further, in the case of the EPS, at least one transfer node 410 has a Serving Gateway (S-GW) and a PDN Gateway (P-GW).

The external network 30 includes a network or a node with which the mobile terminal 210 communicates. User data packets (e.g., IP packets) sent between the external network 30 and the mobile terminal 210 are transferred by the RAN 10 including the base station 110 and the MCN 20 including the transfer node 410. In other words, the mobile terminal 210 communicates with the external network 30 through the RAN 10 and the MCN 20.

In the first reference embodiment, the transfer node 410 (e.g., S-GW) measures a parameter regarding a frequency of communication of the mobile terminal 210. The transfer node 410 may measure the frequency of communication (i.e., communication amount per unit time) of the mobile terminal 210, or may measure the average communication interval of the mobile terminal 210. Specifically, the transfer node 410 may monitor at least one of downlink packets destined for the mobile terminal 210 and uplink packets originated from the mobile terminal 210.

Figure 12:
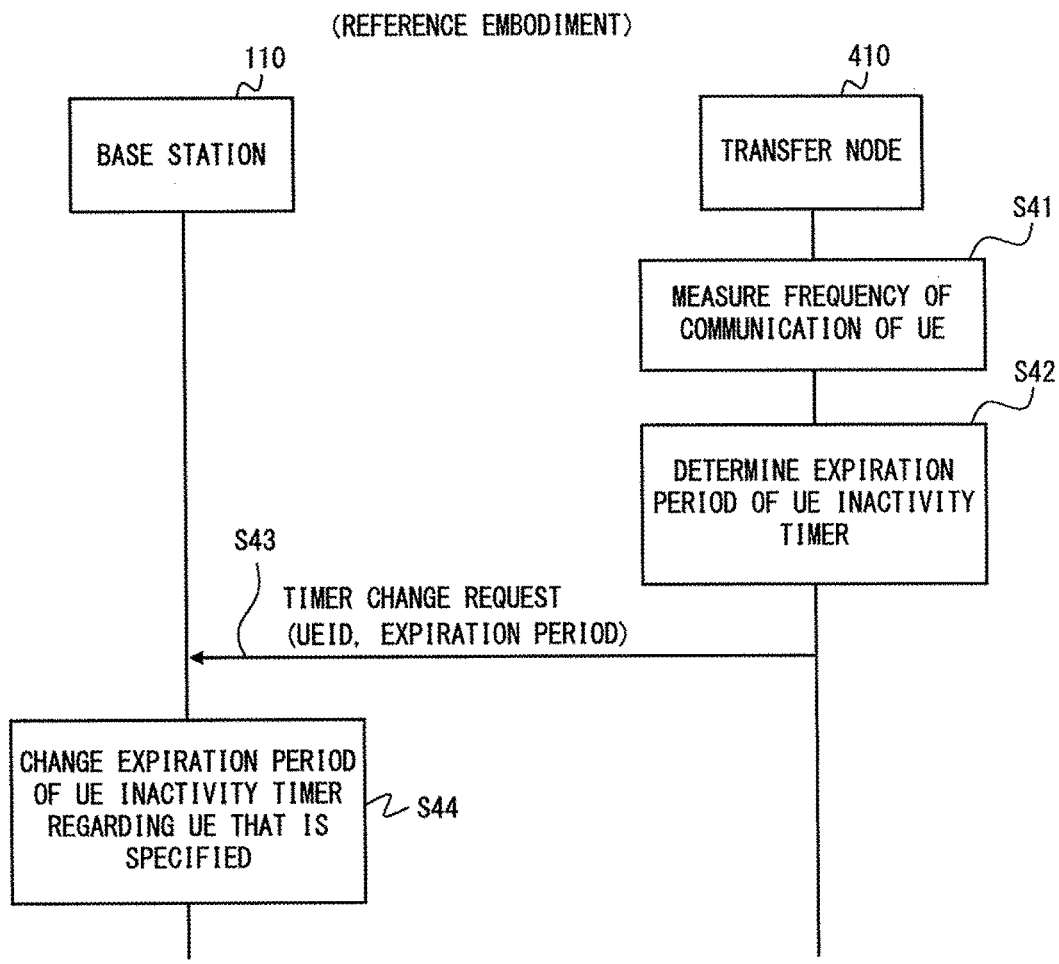
FIG. 12 is a sequence diagram showing an operation of the mobile communication system according to the first reference embodiment.

Further, in the first reference embodiment, the transfer node 410 or the mobility management node 310 determines the expiration period of the UE inactivity timer 101 regarding the mobile terminal 210. FIG. 12 shows a sequence diagram when the transfer node 410 determines the expiration period of the UE inactivity timer 101. In Step S41, the transfer node 410 measures the frequency of communication of the mobile terminal 210. In Step S42, the transfer node 410 determines the expiration period of the UE inactivity timer 101 regarding the mobile terminal 210 based on the result of measuring the frequency of communication of the mobile terminal 210. When the frequency of communication of the mobile terminal 210 exceeds a predetermined threshold or when the frequency of communication falls below the predetermined threshold, the transfer node 410 may detect the mobile terminal 210 as the target on which change of the expiration period of the UE inactivity timer 101 is needed.

The determination (change) of the expiration period of the UE inactivity timer 101 may be performed, for example, as follows. The transfer node 410 may increase the expiration period of the UE inactivity timer 101 when the frequency of communication of the mobile terminal 210 is relatively high compared to the case in which that is relatively low. In other words, the transfer node 410 may increase the expiration period of the UE inactivity timer 101 with increasing the frequency of communication of the mobile terminal 210. In other words, the transfer node 410 may determine to increase the expiration period of the UE inactivity timer 101 when the frequency of communication of the mobile terminal 210 exceeds a predetermined threshold compared to the case in which that is below the threshold. It is therefore possible to increase the time during which the mobile terminal 210 remains in the CONNECTED state. It is therefore expected that the increase in the number of control signals that should be processed by the core network 20, which is caused due to repetition of the CONNECTED-IDLE transition of the mobile terminal 210, can be suppressed.

Further, the transfer node 410 may determine the expiration period of the UE inactivity timer 101 in consideration of an average communication interval of the mobile terminal 210. Specifically, the transfer node 410 may set the expiration period of the UE inactivity timer 101 regarding the mobile terminal 210 to be longer than the average communication interval of the mobile terminal 210. It is therefore expected that the frequency of the IDLE-CONNECTED transition of the mobile terminal 210 decreases and thus the number of control signals that should be processed by the mobility management node 300 decreases.

In Step S43, the transfer node 410 transmits a timer change request to a node in the RAN 10 that executes the UE inactivity timer 101 (i.e., the base station 110). The timer change request includes an identifier (UE Identifier (UEID)) of the target mobile terminal 210, and configuration information indicating the expiration period of the UE inactivity timer 101. In Step S44, the base station 110 changes, based on the timer change request, the expiration period of the UE inactivity timer 101 regarding the mobile terminal 210 that is specified by the request.

Figure 13:
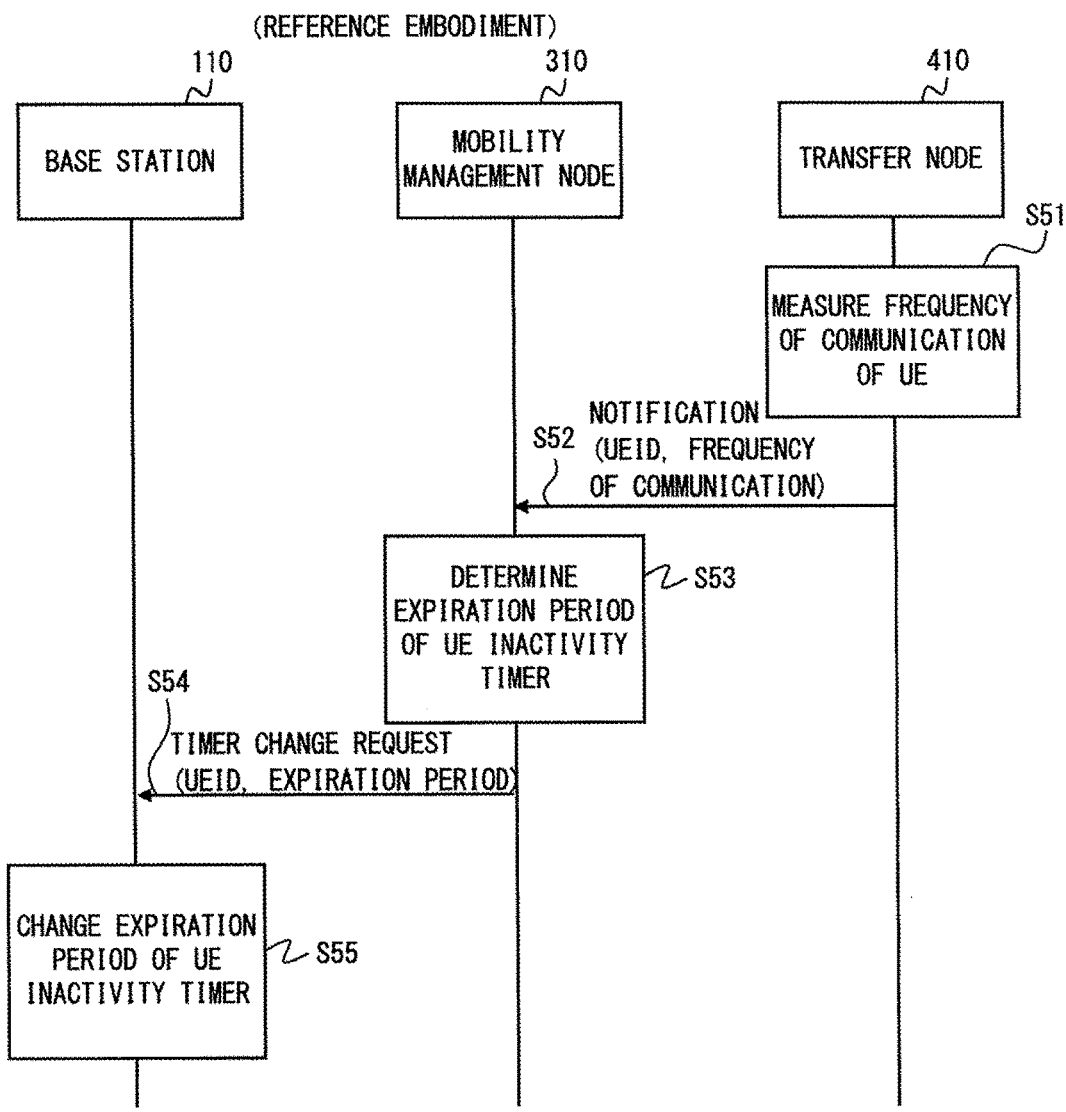
FIG. 13 is a sequence diagram showing an operation of the mobile communication system according to the first reference embodiment.

Meanwhile, FIG. 13 shows a sequence diagram when the mobility management node 310 determines the expiration period of the UE inactivity timer 101. In Step S51, similar to Step S41 shown in FIG. 12, the transfer node 410 measures the frequency of communication of the mobile terminal 210. In Step S51, the transfer node 410 transmits to the mobility management node 310 a notification indicating the result of measuring the frequency of communication of the mobile terminal 210. The transfer node 410 may notify the mobility management node 310 of the result of measuring the frequency of communication regarding the mobile terminal 210 when the frequency of communication of the mobile terminal 210 has exceeded a predetermined threshold or when the frequency of communication has fallen below the predetermined threshold. It is therefore possible to reduce the number of control signals transmitted between the transfer node 410 and the mobility management node 310.

In Step S53, the mobility management node 310 determines the expiration period of the UE inactivity timer 101 regarding the mobile terminal 210 based on the result of measuring the frequency of communication of the mobile terminal 210 received from the transfer node 410. The determination of the expiration period of the UE inactivity timer 101 may be similar to that in Step S42 shown in FIG. 12. In Step S54, the mobility management node 310 transmits a timer change request to a node in the RAN 10 which executes the UE inactivity timer 101 (i.e., the base station 110). In Step S55, the base station 110 changes, based on the timer change request, the expiration period of the UE inactivity timer 101 regarding the mobile terminal 210 that is specified by the request.

Second Reference Embodiment

Figure 14:
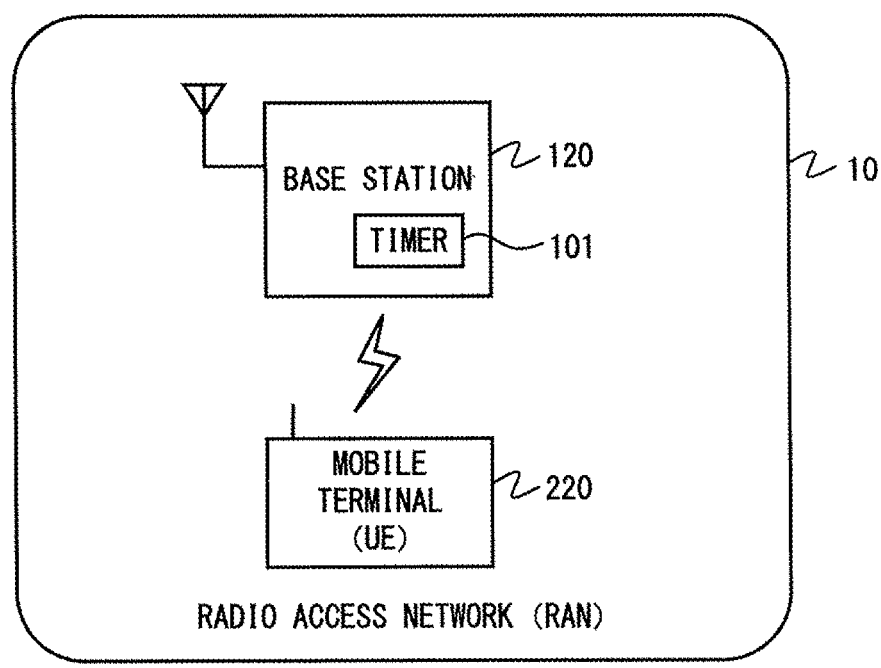
FIG. 14 is a block diagram showing a configuration example of a mobile communication system according to a second reference embodiment.

FIG. 14 is a block diagram showing a configuration example of a mobile communication system according to a second reference embodiment. The configuration example shown in FIG. 14 includes a RAN 10. The RAN 10 includes a base station 120 and a mobile terminal 220. The base station 120 includes a UE inactivity timer 101.

In the second reference embodiment, the mobile terminal 220 measures a parameter regarding the frequency of communication of the mobile terminal 220 (e.g., frequency of communication, communication interval). Specifically, the mobile terminal 220 may monitor at least one of downlink packets received from the base station 120 and uplink packets transmitted to the base station 120 in the communication module of the mobile terminal 220.

Figure 15:
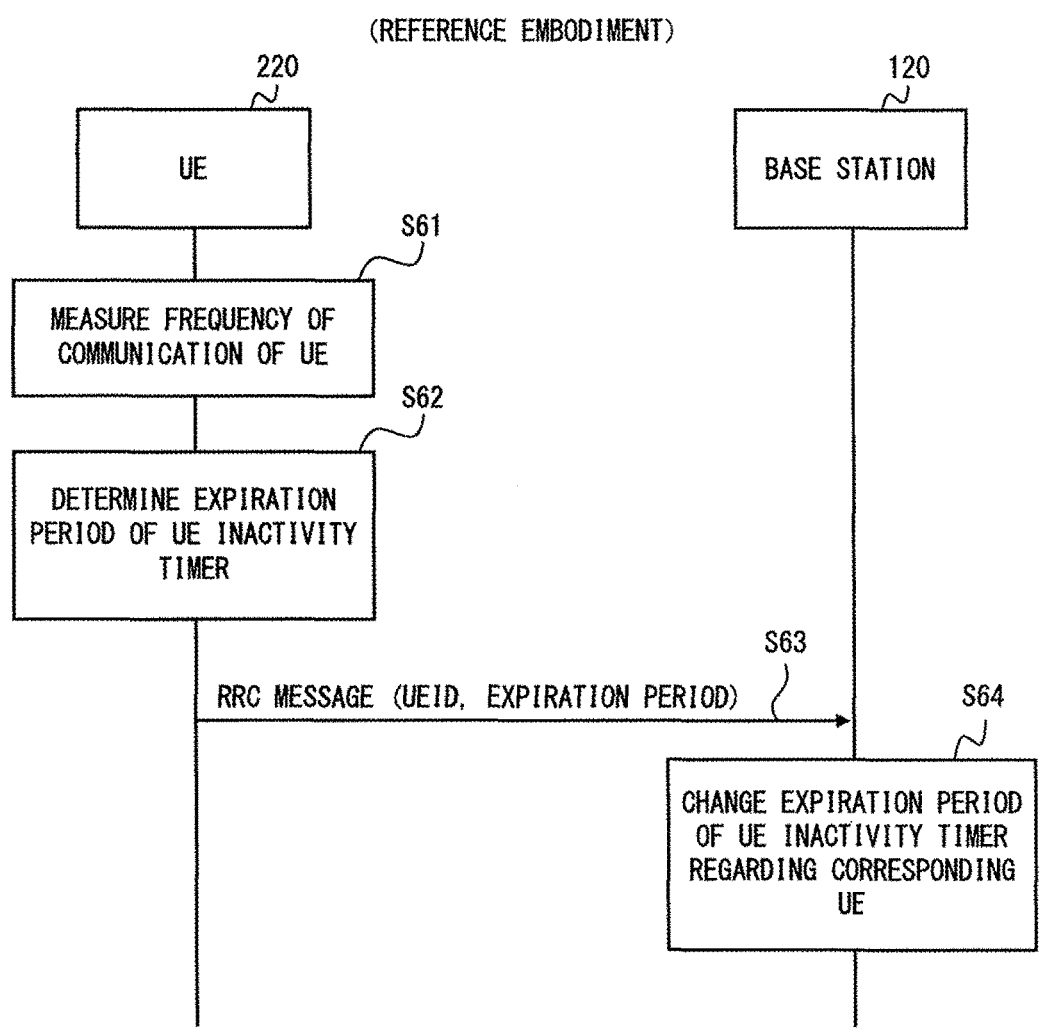
FIG. 15 is a sequence diagram showing an operation of the mobile communication system according to the second reference embodiment.

Further, in the second reference embodiment, the mobile terminal 220 or the base station 120 determines the expiration period of the UE inactivity timer 101 regarding the mobile terminal 220. FIG. 15 shows a sequence diagram of a case in which the mobile terminal 220 determines the expiration period of the UE inactivity timer 101. In Step S61, the mobile terminal 220 measures the frequency of communication of the mobile terminal 220. In Step S62, the mobile terminal 220 determines the expiration period of the UE inactivity timer 101 regarding the mobile terminal 220 based on the measurement result of the frequency of communication of the mobile terminal 220. The determination of the expiration period of the UE inactivity timer 101 in Step S62 may be similar to that in Step S42 shown in FIG. 12. The mobile terminal 220 may determine the expiration period of the UE inactivity timer 101 in Step S62 when the frequency of communication of the mobile terminal 220 has exceeded a predetermined threshold or when the frequency of communication of the mobile terminal 220 has fallen below the predetermined threshold.

In Step S63, the mobile terminal 220 transmits a timer change request to a node in the RAN 10 that executes the UE inactivity timer 101 (i.e., the base station 120). The timer change request includes an identifier (UEID) of the target mobile terminal 220, and configuration information indicating the expiration period of the UE inactivity timer 101. The transmission of the timer change request may be performed using a message on the control layer terminated by the mobile terminal 220 and the base station 120 (e.g., message on the Radio Resource Control (RRC) layer. A new RRC message (e.g., "RRC Inactivity Timer Change Request" message) may be defined for the timer change request.

In Step S64, in response to the time change request for the mobile terminal, the base station 120 changes the expiration period of the UE inactivity timer 101 regarding this terminal.

Figure 16:
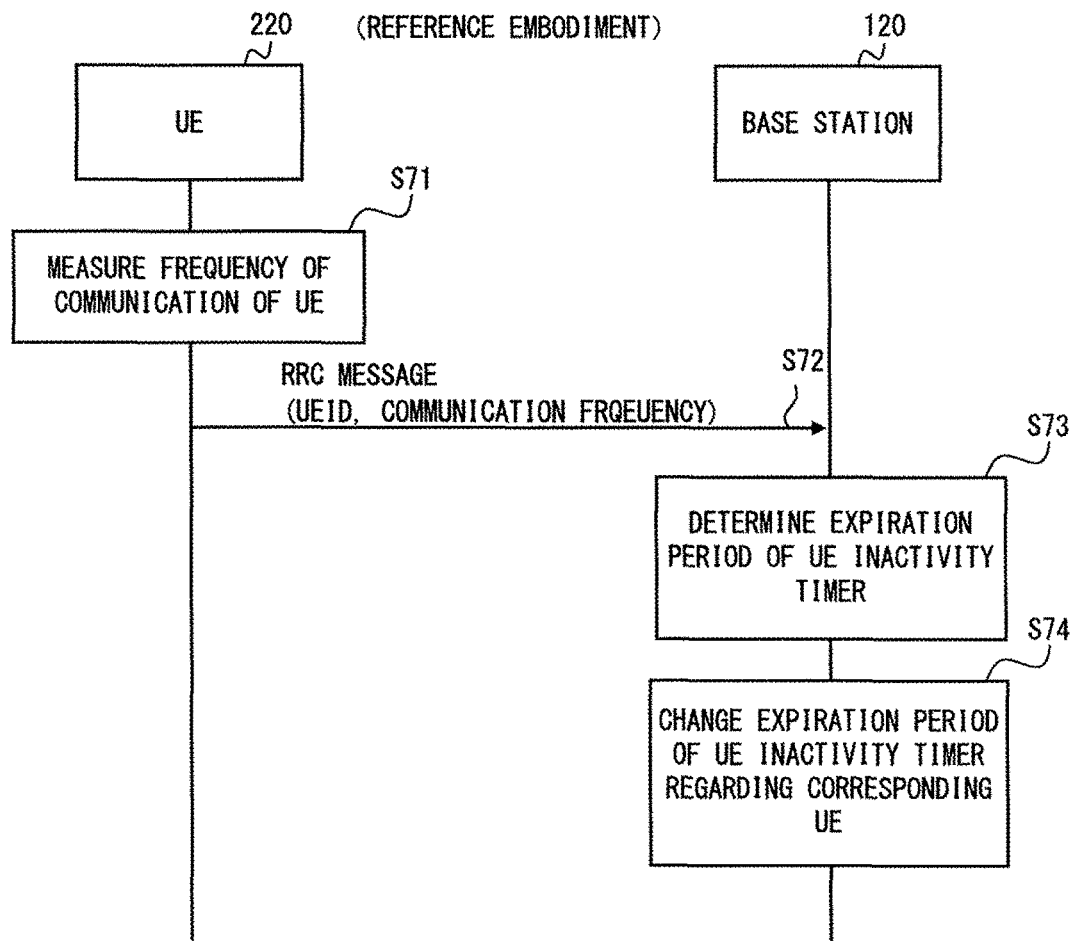
FIG. 16 is a sequence diagram showing an operation of the mobile communication system according to the second reference embodiment.

Meanwhile, FIG. 16 shows a sequence diagram when the base station 120 determines the expiration period of the UE inactivity timer 101. In Step S71, as is similar to Step S61, the mobile terminal 220 measures the frequency of communication of the mobile terminal 220. In Step S72, the mobile terminal 220 transmits to the base station 120 a notification indicating the measurement result of the frequency of communication of the mobile terminal 220. The transmission of the notification may be performed using a message on the RRC layer. The mobile terminal 220 may transmit the notification in Step S72 when the frequency of communication of the mobile terminal 220 has exceeded a predetermined threshold or when the frequency of communication has fallen below the predetermined threshold.

In Step S73, the base station 120 determines the expiration period of the UE inactivity timer 101 regarding the mobile terminal 220 based on the measurement result of the frequency of communication of the mobile terminal 220 received from the mobile terminal 220. The determination of the expiration period of the UE inactivity timer 101 may be similar to that in Step S42 shown in FIG. 12. In Step S74, the base station 120 changes the expiration period of the UE inactivity timer 101 regarding the mobile terminal 220.

In this reference embodiment, the base station 120 may change the expiration period of only the UE inactivity timer 101 separately applied to the specific mobile terminal 220 in which the frequency of communication has exceeded a predetermined threshold (or the frequency of communication has fallen below the predetermined threshold). In some architectures, however, the base station 120 may not be able to set the expiration period of the UE inactivity timer 101 for each mobile terminal. In this case, the base station 120 may update the configuration value of the expiration period of the UE inactivity timer 101 commonly applied to a plurality of mobile terminals 220 including the specific mobile terminal 220 in which the frequency of communication has exceeded the predetermined threshold (or the frequency of communication has fallen below the predetermined threshold).

Third Reference Embodiment

Figure 17:
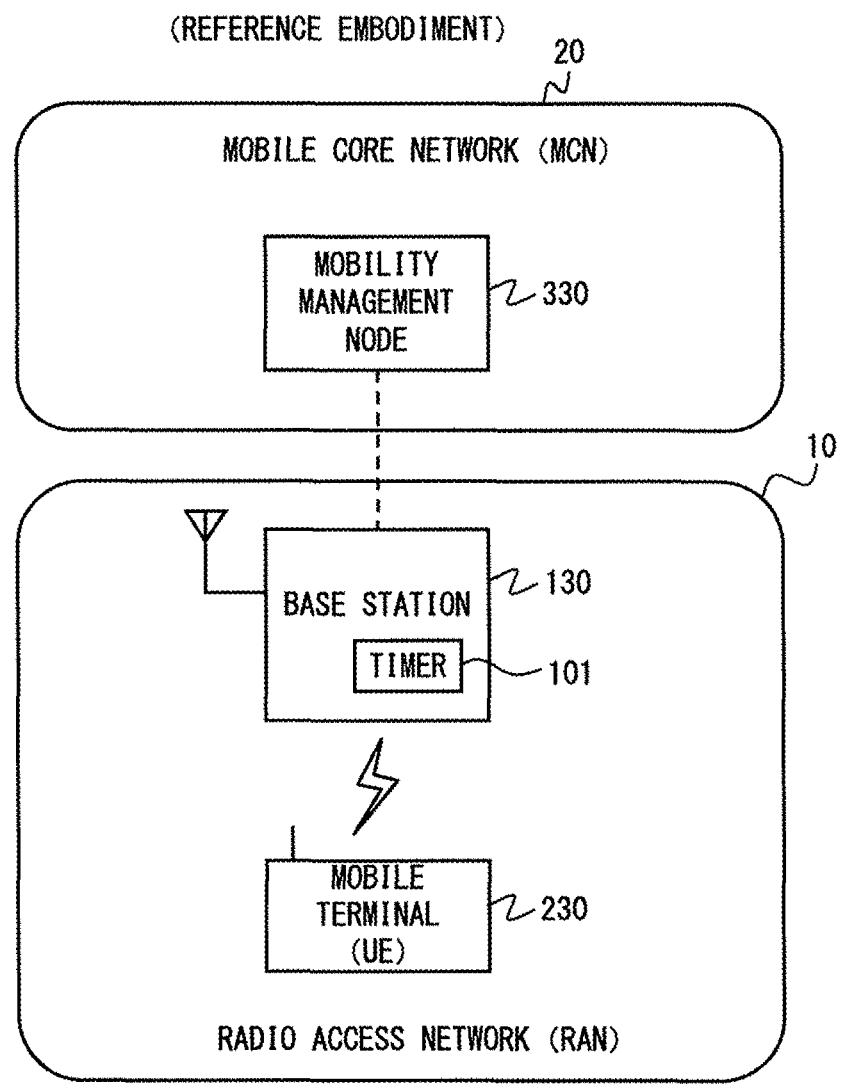
FIG. 17 is a block diagram showing a configuration example of a mobile communication system according to a third reference embodiment.

FIG. 17 is a block diagram showing a configuration example of a mobile communication system according to a third reference embodiment. The configuration example shown in FIG. 17 includes a RAN 10 and an MCN 20. The RAN 10 includes a base station 130 and a mobile terminal 230. The base station 130 includes a UE inactivity timer 101. The MCN 20 includes a mobility management node 330 as a control plane entity.

In the third reference embodiment, the mobile terminal 230 measures a parameter regarding a frequency of communication of the mobile terminal 230 (e.g., frequency of communication, communication interval). Specifically, the mobile terminal 230 may monitor at least one of downlink packets received from the base station 130 and uplink packets transmitted to the base station 130 in the communication module of the mobile terminal 230.

Figure 18:
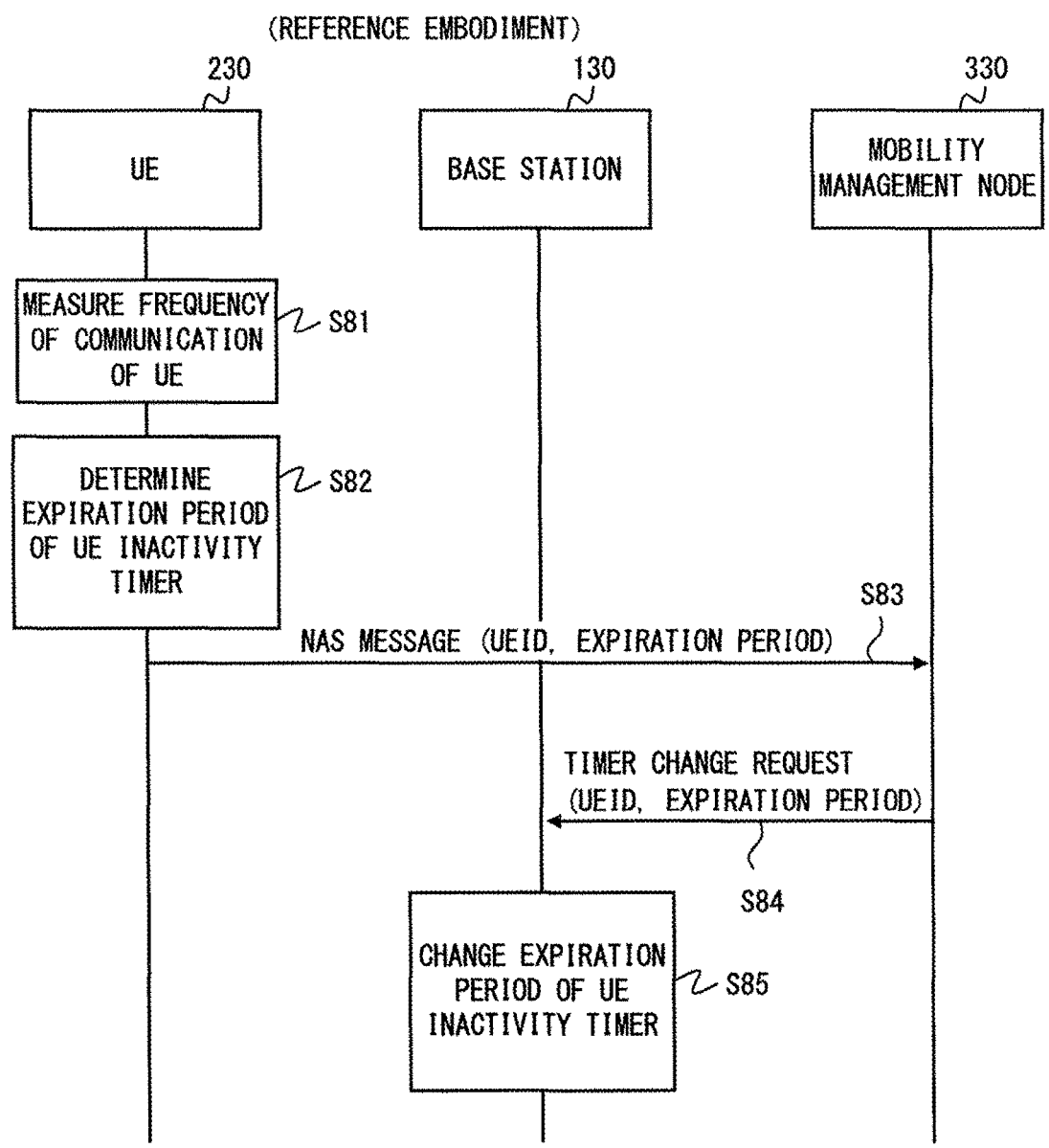
FIG. 18 is a sequence diagram showing an operation of the mobile communication system according to the third reference embodiment.

Further, in the second reference embodiment, the mobile terminal 230 or the mobility management node 330 determines the expiration period of the UE inactivity timer 101 regarding the mobile terminal 230. FIG. 18 shows a sequence diagram in the case in which the mobile terminal 230 determines the expiration period of the UE inactivity timer 101. The processes in Steps S81 and S82 may be similar to those in Steps S61 and S62 shown in FIG. 15.

In Step S83, the mobile terminal 230 transmits a timer change request to the mobility management node 330. The timer change request includes an identifier (UEID) of the target mobile terminal 220, and configuration information indicating the expiration period of the UE inactivity timer 101. The transmission of the timer change request may be performed using a message on the control layer terminated by the mobile terminal 230 and the mobility management node 330 (e.g., message on the Non-Access Stratum (NAS) layer). A new NAS message may be defined for the timer change request.

In Step S84, the mobility management node 330 transmits a timer change request to a node in the RAN 10 that executes the UE inactivity timer 101, i.e., the base station 130, in response to the reception of the timer change request from the mobile terminal 220. In Step S85, the base station 130 changes, based on the timer change request, the expiration period of the UE inactivity timer 101 regarding the mobile terminal 230 that is specified by the request.

Figure 19:
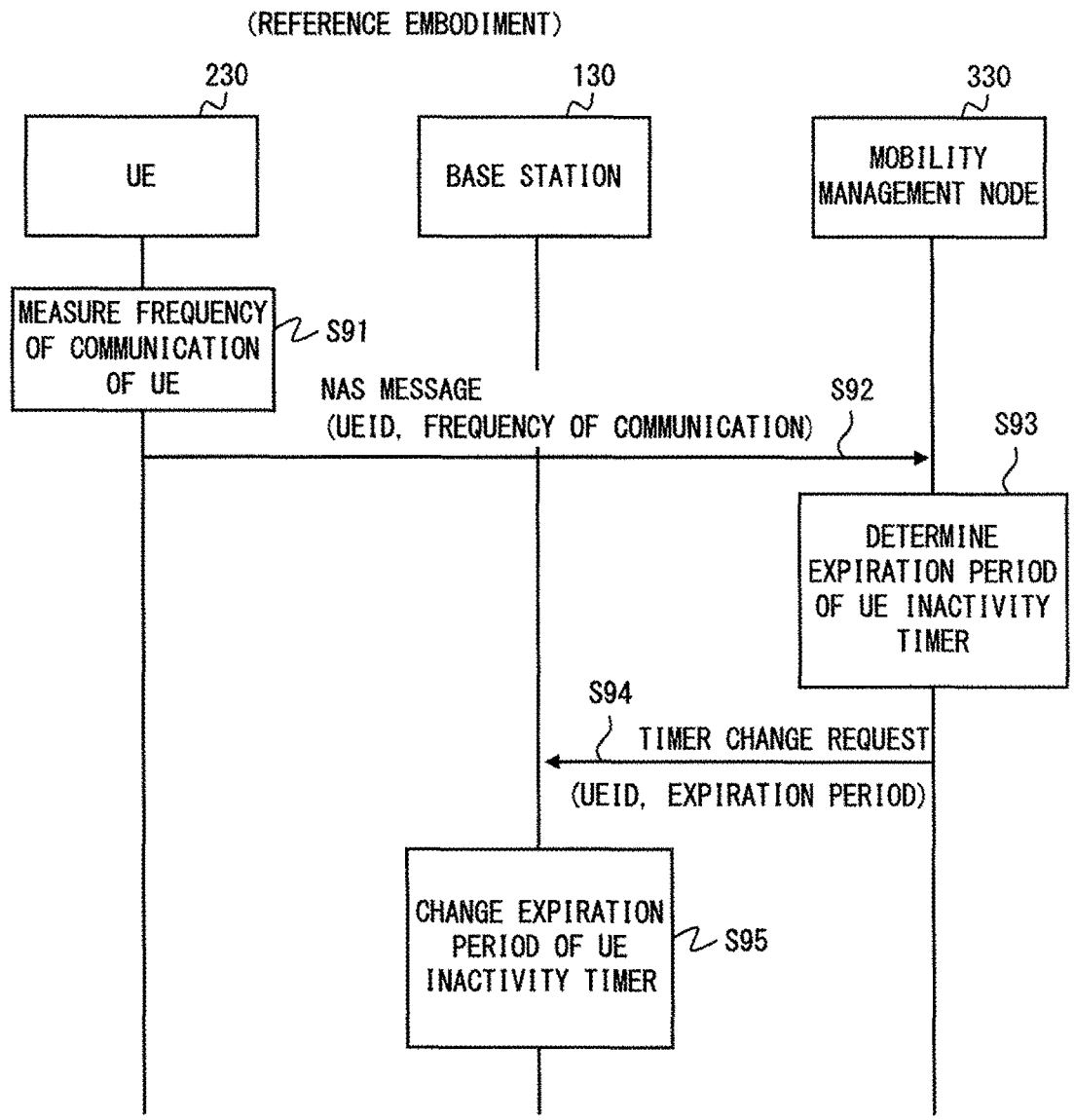
FIG. 19 is a sequence diagram showing an operation of the mobile communication system according to the third reference embodiment.

Meanwhile, FIG. 19 shows a sequence diagram of a case in which the mobility management node 330 determines the expiration period of the UE inactivity timer 101. In Step S91, similar to Step S81 shown in FIG. 18, the mobile terminal 230 measures the frequency of communication of the mobile terminal 230. In Step S92, the mobile terminal 230 transmits to the mobility management node 330 a notification indicating the measurement result of the frequency of communication of the mobile terminal 230. The transmission of this notification may be performed using a message on the NAS layer. The mobile terminal 230 may perform notification of Step S792 when the frequency of communication of the mobile terminal 230 has exceeded a predetermined threshold or when the frequency of communication has fallen below the predetermined threshold.

In Step S93, the mobility management node 330 determines, based on the measurement result of the frequency of communication of the mobile terminal 230 received from the mobile terminal 230, the expiration period of the UE inactivity timer 101 regarding the mobile terminal 230. The processes in Steps S94 and S95 may be similar to those in Steps S54 and S55 in FIG. 13.

In this reference embodiment, the base station 130 may change the expiration period of only the UE inactivity timer 101 separately applied to the specific mobile terminal 230 in which the frequency of communication has exceeded a predetermined threshold (or the frequency of communication has fallen below the predetermined threshold). Alternatively, the base station 130 may update the configuration value of the expiration period of the UE inactivity timer 101 commonly applied to a plurality of mobile terminals 230 including the specific mobile terminal 230 in which the frequency of communication has exceeded a predetermined threshold (or the frequency of communication has fallen below the predetermined threshold).

Fourth Reference Embodiment

Figure 20:
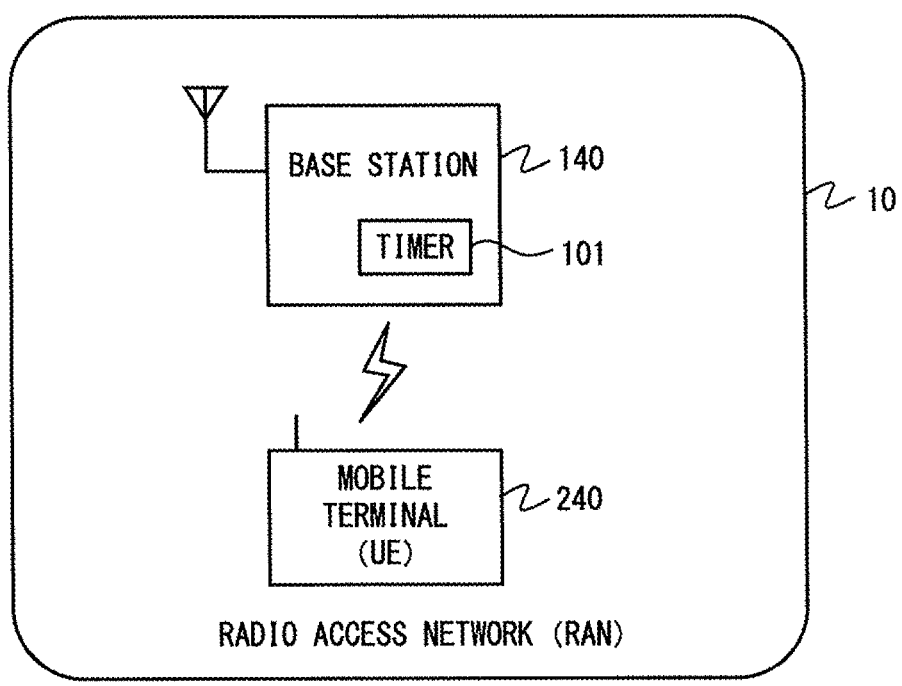
FIG. 20 is a block diagram showing a configuration example of a mobile communication system according to a fourth reference embodiment.

FIG. 20 is a block diagram showing a configuration example of a mobile communication system according to a fourth reference embodiment. The configuration example shown in FIG. 20 includes a RAN 10. The RAN 10 includes a base station 140 and a mobile terminal 240. The base station 140 includes a UE inactivity timer 101.

In the fourth reference embodiment, the base station 140 measures a parameter regarding a frequency of communication of the mobile terminal 240 (e.g., frequency of communication, communication interval). The base station 140 determines, based on the measurement result of the parameters regarding the frequency of communication of the mobile terminal 240, the expiration period of the UE inactivity timer 101 regarding the mobile terminal 240.

Figure 21:
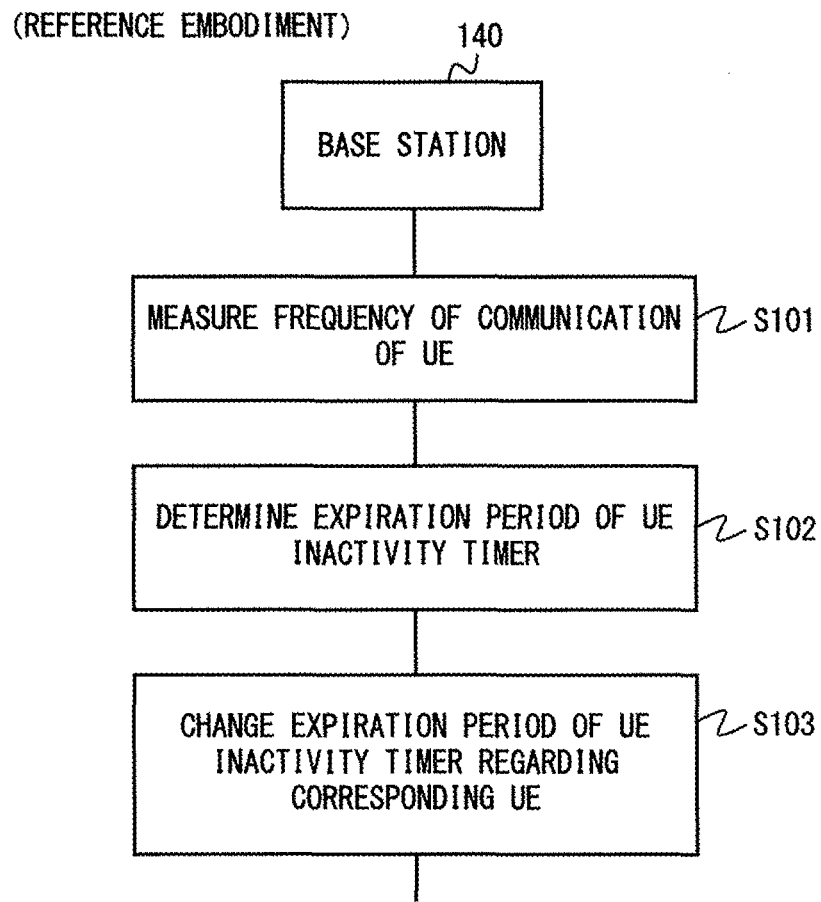
FIG. 21 is a flowchart showing an operation of the mobile communication system according to the fourth reference embodiment.

FIG. 21 is a flowchart in a case in which the base station 140 performs both the monitoring of the frequency of communication of the mobile terminal 240 and the determination of the expiration period of the UE inactivity timer 101. In Step S101, the base station 140 measures a parameter (e.g., frequency of communication, communication interval) regarding the frequency of communication of the mobile terminal 220. The base station 140 may measure, for example, an arrival frequency or an average arrival interval of downlink packets for the mobile terminal 240 in a Packet Domain Convergence Protocol (PDCP) layer. Further or alternatively, the base station 140 may measure, for example, a reception frequency or an average reception interval of uplink radio resource allocation requests (e.g., scheduling requests) from the mobile terminal 240.

In Step S102, the base station 140 determines, based on the measurement result of the frequency of communication of the mobile terminal 240, the expiration period of the UE inactivity timer 101 regarding the mobile terminal 240. The determination of the expiration period of the UE inactivity timer 101 may be similar to that in Step S42 in FIG. 12. In Step S103, the base station 140 changes the expiration period of the UE inactivity timer 101 regarding the mobile terminal 240.

In this reference embodiment, the base station 140 may change the expiration period of only the UE inactivity timer 101 separately applied to the specific mobile terminal 240 in which the frequency of communication has exceeded a predetermined threshold (or the frequency of communication has fallen below the predetermined threshold). Alternatively, the base station 140 may update a configuration value of the expiration period of the UE inactivity timer 101 commonly applied to a plurality of mobile terminals 240 including the specific mobile terminal 240 in which the frequency of communication has exceeded a predetermined threshold (or the frequency of communication has fallen below the predetermined threshold).

The technical ideas described in the above first to fourth reference embodiments may be described, for example, as shown in the following Supplementary notes.

(Supplementary Note 1)

A mobile communication system including:

a RAN node that is arranged in a radio access network and executes a timer used to determine a transition from a CONNECTED state to an IDLE state of a mobile terminal connected to a mobile core network through the radio access network;

a transfer node that is arranged in the mobile core network and performs processing for transferring user data transmitted or received by the mobile terminal; and a mobility management node that is arranged in the mobile core network and performs mobility management of the mobile terminal, wherein:

the transfer node is configured to measure a frequency of communication of the mobile terminal, and at least one of the transfer node and the mobility management node is configured to notify the RAN node of an expiration period of the timer determined based on the frequency of communication.

(Supplementary Note 2)

The mobile communication system according to Supplementary note 1, in which the transfer node is configured to determine the expiration period based on the frequency of communication and to transmit to the RAN node a request including timer configuration information indicating the expiration period.

(Supplementary Note 3)

The mobile communication system according to Supplementary note 1, in which:

the transfer node is configured to transmit to the mobility management node a notification including measurement data indicating the frequency of communication, and the mobility management node is configured to determine the expiration period based on the frequency of communication and to transmit to the RAN node a request including timer configuration information indicating the expiration period.

(Supplementary Note 4)

The mobile communication system according to any one of Supplementary notes 1 to 3, in which the RAN node is a base station.

(Supplementary Note 5)

A transfer node that is arranged in a mobile core network and performs processing for transferring user data transmitted or received by a mobile terminal connected to the mobile core network through a radio access network, the transfer node including:

a measurement unit that measures a frequency of communication of the mobile terminal;

a determination unit that determines, based on the frequency of communication, an expiration period of a timer used to determine a transition from a CONNECTED state to an IDLE state of the mobile terminal; and a notification unit that notifies a RAN node arranged in the radio access network that executes the timer of the expiration period.

(Supplementary Note 6)

A mobility management node that is arranged in a mobile core network and performs mobility management of a mobile terminal connected to the mobile core network through a radio access network, the mobility management node including:

a reception unit that receives, from a transfer node that performs processing for transferring user data, measurement data indicating a frequency of communication of the mobile terminal;

a determination unit that determines, based on the frequency of communication, an expiration period of a timer used to determine a transition from a CONNECTED state to an IDLE state of the mobile terminal; and a notification unit that notifies, of the expiration period, a RAN node arranged in the radio access network and executing the timer.

(Supplementary Note 7)

A mobile communication system including:

a mobile terminal that is connected to a mobile core network through a radio access network; and a RAN node that is arranged in the radio access network and executes a timer used to determine a transition from a CONNECTED state to an IDLE state of the mobile terminal connected to the mobile core network through the radio access network, in which:

the mobile terminal is configured to measure a frequency of communication of the mobile terminal, and at least one of the mobile terminal and the RAN node is configured to determine an expiration period of the timer based on the frequency of communication.

(Supplementary Note 8)

The mobile communication system according to Supplementary note 7, in which the mobile terminal is configured to determine the expiration period based on the frequency of communication and to transmit a request including timer configuration information indicating the expiration period to the RAN node.

(Supplementary Note 9)

The mobile communication system according to Supplementary note 8, in which the request is transmitted as a Radio Resource Control (RRC) message.

(Supplementary Note 10)

The mobile communication system according to Supplementary note 7, in which:

the mobile terminal is configured to transmit to the RAN node a notification including measurement data indicating the frequency of communication, and the RAN node is configured to determine the expiration period based on the frequency of communication.

(Supplementary Note 11)

The mobile communication system according to Supplementary note 10, in which the notification is transmitted as a Radio Resource Control (RRC) message.

(Supplementary Note 12)

The mobile communication system according to any one of Supplementary notes 7 to 11, in which the RAN node is a base station.

(Supplementary Note 13)

A mobile terminal connected to a mobile core network through a radio access network, the mobile terminal including:

a measurement unit that measures a frequency of communication of the mobile terminal;

a determination unit that determines, based on the frequency of communication, an expiration period of a timer used to determine a transition from a CONNECTED state to an IDLE state of the mobile terminal; and a notification unit that notifies, of the expiration period, a RAN node arranged in the radio access network and executing the timer.

(Supplementary Note 14)

A RAN node including:

a timer unit that executes a timer used to determine a transition from a CONNECTED state to an IDLE state of a mobile terminal connected to a mobile core network through a radio access network;

a reception unit that receives measurement data indicating a frequency of communication of the mobile terminal from the mobile terminal; and a determination unit that determines an expiration period of the timer based on the frequency of communication.

(Supplementary Note 15)

A mobile communication system including:

a mobile terminal that is connected to a mobile core network through a radio access network;

a RAN node that is arranged in the radio access network and executes a timer used to determine a transition from a CONNECTED state to an IDLE state of the mobile terminal connected to the mobile core network through the radio access network; and a mobility management node that is arranged in the mobile core network and performs mobility management of the mobile terminal, in which:

the mobile terminal is configured to measure a frequency of communication of the mobile terminal, at least one of the mobile terminal and the mobility management node is configured to determine an expiration period of the timer based on the frequency of communication, and the mobility management node is configured to transmit to the RAN node a first request including timer configuration information indicating the expiration period.

(Supplementary Note 16)

The mobile communication system according to Supplementary note 15, in which:

the mobile terminal is configured to determine the expiration period based on the frequency of communication and to transmit to the mobility management node a second request including timer configuration information indicating the expiration period, and the mobility management node is configured to transmit the first request in accordance with the second request.

(Supplementary Note 17)

The mobile communication system according to Supplementary note 16, in which the second request is transmitted as a Non-Access Stratum (NAS) message.

(Supplementary Note 18)

The mobile communication system according to Supplementary note 15, in which:

the mobile terminal is configured to transmit to the mobility management node a notification including measurement data indicating the frequency of communication, and the mobility management node is configured to determine the expiration period based on the frequency of communication.

(Supplementary Note 19)

The mobile communication system according to Supplementary note 18, in which the notification is transmitted as a Non-Access Stratum (NAS) message.

(Supplementary Note 20)

A mobile terminal connected to a mobile core network through a radio access network, the mobile terminal including:

a measurement unit that measures a frequency of communication of the mobile terminal;

a determination unit that determines, based on the frequency of communication, an expiration period of a timer used to determine a transition from a CONNECTED state to an IDLE state of the mobile terminal; and a notification unit that notifies, of the expiration period, a mobility management node performing mobility management of the mobile terminal.

(Supplementary Note 21)

A mobility management node that is arranged in a mobile core network and performs mobility management of a mobile terminal connected to the mobile core network through a radio access network, the mobility management node including:

a reception unit that receives, from the mobile terminal, measurement data indicating a frequency of communication of the mobile terminal;

a determination unit that determines, based on the frequency of communication, an expiration period of a timer used to determine a transition from a CONNECTED state to an IDLE state of the mobile terminal; and a notification unit that notifies, of the expiration period, a RAN node arranged in the radio access network and executing the timer.

(Supplementary Note 22)

A RAN node including:

a timer unit that executes a timer used to determine a transition from a CONNECTED state to an IDLE state of a mobile terminal connected to a mobile core network through a radio access network;

a measurement unit that measures a frequency of communication of the mobile terminal; and a determination unit that determines an expiration period of the timer based on the frequency of communication.

(Supplementary Note 23)

The RAN node according to Supplementary note 22, in which the measurement unit measures the frequency of communication by measuring a reception frequency of an uplink radio resource request from the mobile terminal.

(Supplementary Note 24)

The RAN node according to Supplementary note 22 or 23, in which the measurement unit measures the frequency of communication by measuring a reception frequency of a downlink data packet for the mobile terminal.

This application is based upon and claims the benefit of priority from Japanese Patent Application No. 2012-153091, filed on Jul. 6, 2012, the disclosure of which is incorporated herein in its entirety by reference.

REFERENCE SIGNS LIST

10 RADIO ACCESS NETWORK (RAN)
20 MOBILE CORE NETWORK (MCN)
30 EXTERNAL NETWORK
100, 110, 120, 130, 140 BASE STATIONS
101 UE INACTIVITY TIMER
200, 210, 220, 230, 240 MOBILE TERMINALS
300, 310, 330 MOBILITY MANAGEMENT NODES
301 ACQUISITION UNIT
302 DETERMINATION UNIT
303 NOTIFICATION UNIT
400 MOBILITY MANAGEMENT NODE
401 SUBSCRIBER DATA
402 CONFIGURATION DATA OF UE INACTIVITY TIMER
410 TRANSFER NODE

The invention claimed is:

1. A method comprising:
    determining, based on a predetermined parameter, an expiration period of a first timer used to determine a transition from a CONNECTED state to an IDLE state of a mobile terminal connected to a mobile core network through a radio access network, wherein
    the predetermined parameter comprises a parameter regarding a load on control signal processing by a mobility management node arranged in the mobile core network, and
    the determining comprises increasing the expiration period when the load on the control signal processing by the mobility management node is a relatively large value compared to a case in which the load on the control signal processing by the mobility management node is a relatively small value.

2. The method according to claim 1, wherein the first parameter indicates a frequency of occurrence of control signals processed by the mobility management node regarding a plurality of mobile terminals including the mobile terminal.

3. The method according to claim 2, wherein the control signals comprises service requests from the plurality of mobile terminals.

4. A method comprising:
determining, based on a predetermined parameter, an expiration period of a first timer used to determine a transition from a CONNECTED state to an IDLE state of a mobile terminal connected to a mobile core network through a radio access network, wherein
the predetermined parameter comprises a parameter regarding a frequency of movement of the mobile terminal between base stations, and
the determining comprises decreasing the expiration period when the frequency of movement is a relatively high value compared to a case in which the frequency of movement is a relatively low value.

5. The method according to claim 4, wherein:
the predetermined parameter further comprises a parameter regarding a frequency of communication of the mobile terminal, and
the determining comprises decreasing the expiration period when the frequency of movement is higher than the frequency of communication compared to a case in which the frequency of movement is lower than the frequency of communication.

6. A method comprising:
determining, based on a predetermined parameter, an expiration period of a first timer used to determine a transition from a CONNECTED state to an IDLE state of a mobile terminal connected to a mobile core network through a radio access network, wherein
the predetermined parameter comprises a parameter regarding a frequency of movement of the mobile terminal between base stations and a parameter regarding a frequency of connection of the mobile terminal to the mobile core network, and
the determining comprises determining the expiration period in consideration of both the frequency of movement and the frequency of connection.

7. The method according to claim 6, wherein the determining comprises decreasing the expiration period when the frequency of movement is higher than the frequency of connection compared to a case in which the frequency of movement is lower than the frequency of connection.

8. A method comprising:
determining, based on a predetermined parameter, an expiration period of a first timer used to determine a transition from a CONNECTED state to an IDLE state of a mobile terminal connected to a mobile core network through a radio access network; and
determining, according to the determination of the expiration period of the first timer, an expiration period of a second timer used to determine a start of discontinuous reception (DRX) while the mobile terminal is in the CONNECTED state, wherein
the predetermined parameter comprises at least one of:
a first parameter regarding a load on control signal processing by a mobility management node arranged in the mobile core network; and
a second parameter regarding a frequency of movement of the mobile terminal between base stations.

9. The method according to claim 8, further comprising acquiring, at the mobility management node, at least one of the first parameter and the second parameter,
wherein the determining the expiration period of the first timer comprises determining, at the mobility management node, the expiration period of the first timer based on at least one of the first parameter and the second parameter.

10. The method according to claim 8, further comprising notifying, of the expiration period of the first timer, a node that is arranged in the radio access network and executes the first timer.

11. The method according to claim 10, wherein the notifying comprises notifying about an update of the expiration period of a plurality of timers regarding a plurality of mobile terminals including the mobile terminal.

12. The method according to claim 8, wherein the first timer measures duration time of an inactive state during which user data regarding the mobile terminal is neither transmitted nor received.

13. The method according to claim 8, wherein the first timer is started by a node arranged in the radio access network.

14. A network node comprising:
a memory that stores instructions; and
at least one hardware processor configured to execute the instructions, causing the at least one hardware processor to determine, based on a predetermined parameter, an expiration period of a first timer used to determine a transition from a CONNECTED state to an IDLE state of a mobile terminal connected to a mobile core network through a radio access network, wherein
the predetermined parameter comprises a parameter regarding a load on control signal processing by a mobility management node arranged in the mobile core network, and
the instructions further cause the at least one hardware processor to determine to increase the expiration period when the load on the control signal processing by the mobility management node is a relatively large value compared to a case in which the load on the control signal processing by the mobility management node is a relatively small value.

15. The network node according to claim 14, wherein the first parameter indicates a frequency of occurrence of control signals processed by the mobility management node regarding a plurality of mobile terminals including the mobile terminal.

16. The network node according to claim 15, wherein the control signals comprises connection requests or service requests from the plurality of mobile terminals.

17. A network node comprising:
a memory that stores instructions; and
at least one hardware processor configured to execute the instructions, causing the at least one hardware processor to determine, based on a predetermined parameter, an expiration period of a first timer used to determine a transition from a CONNECTED state to an IDLE state of a mobile terminal connected to a mobile core network through a radio access network, wherein
the predetermined parameter comprises a parameter regarding a frequency of movement of the mobile terminal between base stations, and
the instructions further cause the at least one hardware processor to determine to decrease the expiration period when the frequency of movement is a relatively high value compared to a case in which the frequency of movement is a relatively low value.

18. The network node according to claim 17, wherein:
the predetermined parameter comprises a parameter regarding a frequency of communication of the mobile terminal; and
the instructions further cause the at least one hardware processor to determine to decrease the expiration period when the frequency of movement is higher than the frequency of communication compared to a case in which the frequency of movement is lower than the frequency of communication.

19. A network node comprising:
a memory that stores instructions; and
at least one hardware processor configured to execute the instructions, causing the at least one hardware processor to determine, based on a predetermined parameter, an expiration period of a first timer used to determine a transition from a CONNECTED state to an IDLE state of a mobile terminal connected to a mobile core network through a radio access network, wherein
the predetermined parameter comprises a parameter regarding a frequency of movement of the mobile terminal between base stations and a parameter regarding a frequency of connection of the mobile terminal to the mobile core network, and
the instructions further cause the at least one hardware processor to determine the expiration period in consideration of both the frequency of movement and the frequency of connection.

20. The network node according to claim 19, wherein the instructions further cause the at least one hardware processor to decrease the expiration period when the frequency of movement is higher than the frequency of connection compared to a case in which the frequency of movement is lower than the frequency of connection.

21. A network node comprising:
a memory that stores instructions; and
at least one hardware processor configured to execute the instructions, causing the at least one hardware processor to:
determine, based on a predetermined parameter, an expiration period of a first timer used to determine a transition from a CONNECTED state to an IDLE state of a mobile terminal connected to a mobile core network through a radio access network; and
determine, according to the determination of the expiration period of the first timer, an expiration period of a second timer used to determine a start of discontinuous reception (DRX) while the mobile terminal is in the CONNECTED state, wherein
the predetermined parameter comprises at least one of:
a first parameter regarding a load on control signal processing by a mobility management node arranged in the mobile core network; and
a second parameter regarding a frequency of movement of the mobile terminal between base stations.

22. The network node according to claim 21, wherein the instructions further cause the at least one hardware processor to:
acquire at least one of the first parameter and the second parameter; and
determine the expiration period of the first timer based on at least one of the acquired first parameter and the second parameter.

23. The network node according to claim 21, wherein the instructions further cause the at least one hardware processor to notify, of the expiration period of the first timer, a node that is arranged in the radio access network and execute the first timer.

24. The network node according to claim 23, wherein the instructions further cause the at least one hardware processor to notify about an update of the expiration period of a plurality of timers regarding a plurality of mobile terminals including the mobile terminal.

25. The network node according to claim 21, wherein the network node is the mobility management node.

26. The network node according to claim 21, wherein the first timer measures duration time of an inactive state during which user data regarding the mobile terminal is neither transmitted nor received.

27. The network node according to claim 21, wherein the first timer is started by a node arranged in the radio access network.

28. A non-transitory computer readable medium storing a program for causing a computer to execute a control method, wherein:
the control method comprises:
determining, based on a predetermined parameter, an expiration period of a first timer used to determine a transition from a CONNECTED state to an IDLE state of a mobile terminal connected to a mobile core network through a radio access network; and
determining, according to the determination of the expiration period of the first timer, an expiration period of a second timer used to determine a start of discontinuous reception (DRX) while the mobile terminal is in the CONNECTED state, and
wherein the predetermined parameter comprises at least one of:
a first parameter regarding a load on control signal processing by a mobility management node arranged in the mobile core network; and
a second parameter regarding a frequency of movement of the mobile terminal between base stations.

* * * * *